US008550907B2

(12) United States Patent
Yamazaki et al.

(10) Patent No.: US 8,550,907 B2
(45) Date of Patent: Oct. 8, 2013

(54) GAME MACHINE

(75) Inventors: Shunpei Yamazaki, Tokyo (JP); Ikuko Kawamata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1946 days.

(21) Appl. No.: 11/374,429

(22) Filed: Mar. 14, 2006

(65) Prior Publication Data

US 2006/0249896 A1 Nov. 9, 2006

(30) Foreign Application Priority Data

Mar. 18, 2005 (JP) ................................. 2005-080763

(51) Int. Cl.
*A63F 13/00* (2006.01)
(52) U.S. Cl.
USPC ........................................................... 463/31
(58) Field of Classification Search
USPC .......................................... 463/16–20, 30–33
See application file for complete search history.

(56) References Cited

U.S. PATENT DOCUMENTS 5,603,659 A * 2/1997 Okada .............................. 463/25
6,409,170 B1 * 6/2002 Sugimoto ................. 273/143 R 2003/0142252 A1 * 7/2003 Luo ................................ 349/110
2004/0166917 A1 * 8/2004 Lam et al. ........................ 463/16
2004/0166932 A1 * 8/2004 Lam et al. ........................ 463/30
2004/0198485 A1 * 10/2004 Loose et al. ..................... 463/20
2005/0037843 A1 * 2/2005 Wells et al. ...................... 463/30
2005/0064936 A1 * 3/2005 Pryor ............................... 463/36

FOREIGN PATENT DOCUMENTS

| JP | 07-152335 A | 6/1995 |
|---|---|---|
| JP | 08-215382 | 8/1996 |
| JP | 10-255976 A | 9/1998 |
| JP | 2001-046582 | 2/2001 |
| JP | 2003-107998 A | 4/2003 |
| JP | 2003-181117 A | 7/2003 |
| JP | 2003-325859 A | 11/2003 |
| JP | 2004-016664 A | 1/2004 |
| JP | 2004-236981 A | 8/2004 |

* cited by examiner

*Primary Examiner* — David L Lewis
*Assistant Examiner* — Eric M Thomas
(74) *Attorney, Agent, or Firm* — Eric J. Robinson; Robinson Intellectual Property Law Office, P.C.

(57) ABSTRACT

The present invention provides a game machine in which the decoration is highly effective. In the present invention, a display screen through which the player can see a game board is provided in front of the game board. The player can see the game board behind the display screen while enjoying an image on the display screen. A plurality of display screens may be provided to overlap each other and a display screen can be also mounted to the game board. Therefore, a various complicated image can be displayed. In addition, an input means can be provided to the display screen with which a player can change a game state.

28 Claims, 13 Drawing Sheets

GAME MACHINE

BACKGROUND OF THE INVENTION

1. Field of the Invention

The present invention relates to a game machine having a display device.

2. Description of the Related Art

As a game machine with which a player can play a predetermined game, a game machine such as a pachinko machine, a slot machine, and a large sized game machine can be given. In such a game machine, a lamp or a light emitting diode (also referred to as an LED) is provided over a surface of a game board. The game machine has a function of making the lamp or a light emitting diode shine or turn on and off according to a game state so that a player does not get bored, and can enjoy the game.

In addition, a light emitting means is provided over a game board to produce strong visual stimulation to encourage a player to play (for example, see Patent Document 1)

[Patent Document 1] Japanese Patent Laid-Open No. H8-215382

SUMMARY OF THE INVENTION

The present invention provides a game machine in which the stage effects and decoration is highly effective. In addition, it is an object of the present invention to provide a game machine which can further encourage a player to play the game machine.

In the present invention, a display screen through which a player can see a game board is provided in front of the game board. The player can see the game board behind the display screen while enjoying an image on the display screen. A plurality of display screens may be provided to overlap each other and a display screen can be also mounted to the game board. Therefore, various complicated images can be displayed. In addition, an input means can be provided to the display screen with which a player can change a game state. In addition, by using an input means, a condition around the game machine and condition of the player can be detected. Therefore, the use efficiency of the game machine can be increased and security control for preventing fraudulent acts can be conducted. A game machine of the present invention enables the player to enjoy one's own game with various stimulating images and various operating methods with the use of an input means shown on the display screen; thereby the player can be encouraged to play the game machine.

A display device to which the present invention can be applied includes a light emitting display device having a TFT connected to a light emitting element in which a layer containing an organic material, an inorganic material or a mixture of an organic material and an inorganic material which emit light called electroluminescence (hereinafter also referred to as EL) is provided between electrodes. An electroluminescence element can emit light with high luminance, for example, 100 to 10000 $cd/m^2$, so that various stimulating images can be displayed. The light emitting display device has an advantage that a response time is short. In addition, since the light emitting display device is a spontaneous light emitting device, there are advantages that reduction in the thickness and the weight are possible. A light emitting element of the present invention, which utilizes electroluminescence, is classified according to whether a light emitting material thereof is an organic material or an inorganic material. In general, the former is referred to as an organic EL element and the latter is referred to as an inorganic EL element The present invention can be applied to any game machine having a display device such as a pinball machine in addition to a pachinko machine, and a slot machine.

An example of the game machine of the present invention comprises a display screen having a light emitting element which has a light emitting material interposed between a pair of light transmitting electrodes formed over a light transmitting substrate, an input means mounted to the display screen, and a game board placed behind the display screen, wherein a metal ball having a light reflective surface passes between the display screen and the game board so that light emitted from the light emitting element is scattered.

An example of the game machine of the present invention comprises a display screen having a light emitting element which has a light emitting material interposed between a pair of light transmitting electrodes formed over a light transmitting substrate, an input means mounted to the display screen, and a game board placed behind the display screen, wherein a metal ball having a light reflective surface passes between the display screen and the game board so that light emitted from the light emitting element is scattered, and the display screen is changed according to information inputted by the input means.

An example of the game machine of the present invention comprises a display screen having a light emitting element which has a light emitting material interposed between a pair of light transmitting electrodes formed over a light transmitting substrate, an input means mounted to the display screen, and a game board placed behind the display screen, wherein a metal ball having a light reflective surface passes between the display screen and the game board so that light emitted from the light emitting element is scattered, and a game state is changed according to information inputted by the input means.

An example of the game machine of the present invention comprises a display screen having a light emitting element which has a light emitting material interposed between a pair of light transmitting electrodes formed over a light transmitting substrate, an input means mounted to the display screen, a game board placed behind the display screen, and a detecting means for detecting a game state, wherein a metal ball having a light reflective surface passes between the display screen and the game board so that light emitted from the light emitting element is scattered, and when the game state is changed according to information inputted by the input means and the game state is detected by the detecting means, a display is changed to display information according to the game state which is detected.

An example of the game machine of the present invention comprises a first display screen having a light emitting element which includes a light emitting material interposed between a pair of light transmitting electrodes formed over a light transmitting substrate, an input means mounted to the first display screen, a second display screen placed behind the first display screen, and a rotation starting means and a rotation stopping means which rotate the second display screen around a rotation axis parallel to a surface of the second display screen, wherein a three-dimensional image is displayed on the second display screen which is rotated by the rotation starting means, and a two-dimensional image is displayed on the second display screen which is stopped by the rotation stopping means.

An example of the game machine of the present invention comprises a first display screen having a light emitting element which has a light emitting material interposed between a pair of light transmitting electrodes formed over a light transmitting substrate, an input means mounted to the first display screen, a second display screen placed behind the first display screen, and a rotation starting means and a rotation stopping means which rotate the second display screen around a rotation axis parallel to a surface of the second display screen, wherein a three-dimensional image is displayed on the second display screen which is rotated by the rotation starting means, and a two-dimensional image is displayed on the second display screen which is stopped by the rotation stopping means, and the first display screen is changed according to information inputted by the input means.

An example of the game machine of the present invention comprises a first display screen having a light emitting element which has a light emitting material interposed between a pair of light transmitting electrodes formed over a light transmitting substrate, an input means mounted to the first display screen, a second display screen placed behind the first display screen, and a rotation starting means and a rotation stopping means which rotate the second display screen around a rotation axis parallel to a surface of the second display screen, wherein a three-dimensional image is displayed on the second display screen which is rotated by the rotation starting means, and a two-dimensional image is displayed on the second display screen which is stopped by the rotation stopping means, and a game state is changed according to information inputted by the input means.

An example of the game machine of the present invention comprises a first display screen having a light emitting element which has a light emitting material interposed between a pair of light transmitting electrodes formed over a light transmitting substrate, an input means mounted to the first display screen, a second display screen placed behind the first display screen, a rotation starting means and a rotation stopping means which rotate the second display screen around a rotation axis parallel to a surface of the second display screen, and a detecting means for detecting a game state, wherein a three-dimensional image is displayed on the second display screen which is rotated by the rotation starting means, and a two-dimensional image is displayed on the second display screen which is stopped by the rotation stopping means, and when the game state is changed according to information inputted by the input means and the game state is detected by the detecting means, a display is changed to display information according to the game state which is detected.

In the foregoing structures, the display screen displays an image according to a video signal and has a driver circuit portion to which the video signal is inputted, and the driver circuit portion has a circuit for controlling a grayscale according to information to be displayed on the display screen.

In the foregoing structures, the display screen displays an image according to a video signal and has a driver circuit portion to which the video signal is inputted, and the driver circuit portion has a control circuit for controlling a grayscale according to information to be displayed on the display screen.

In the foregoing structures, the display screen displays an image according to a video signal and has a driver circuit portion to which the video signal is inputted, and the driver circuit portion controls emission intensity of the light emitting element according to information to be displayed on a first region in the display screen, and has a control circuit for controlling emission intensity of the light emitting element in a second region in the display screen.

In the foregoing structures, the display screen displays an image according to a video signal and has a driver circuit portion to which the video signal is inputted, and the driver circuit portion has a control circuit for controlling a plurality of emission intensity of the light emitting element according to information to be displayed on the display screen.

According to the present invention, a game machine in which the stage effects and decoration is highly effective can be manufactured. In addition, a game machine which can encourage a player to play the game machine can be provided.

BRIEF DESCRIPTION OF DRAWINGS

FIGS. 2A to 2C are views for explaining a game machine of the present invention;

DETAILED DESCRIPTION OF THE INVENTION

Embodiment Mode

Figure 1:
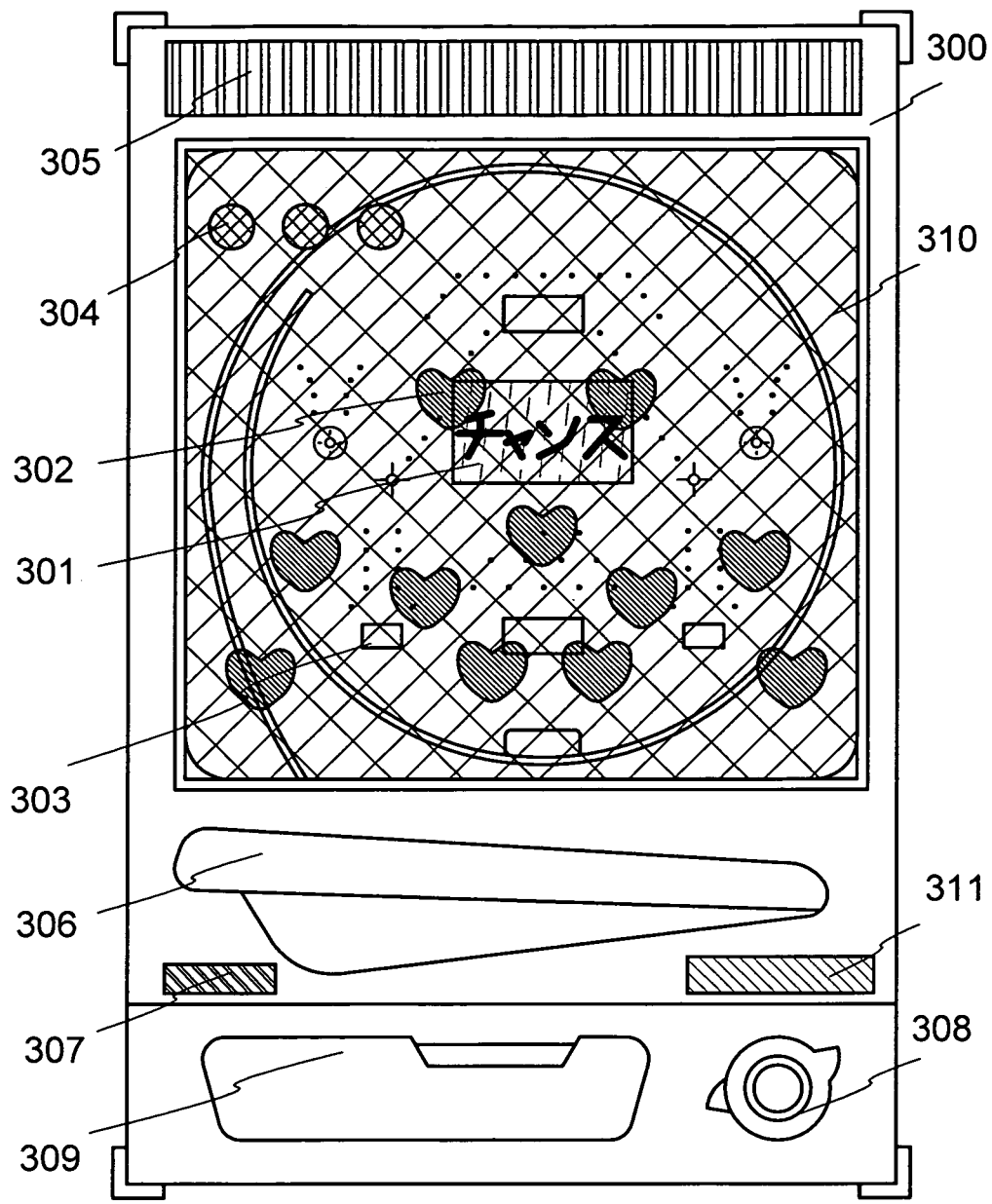
FIG. 1 is a view explaining a game machine of the present invention.

Embodiment Modes of the present invention will be described in detail with reference to the accompanying drawings. However, the invention is not limited to the following description and it is easily understood by those skilled in the art that various changes and modifications are possible, unless such changes and modifications depart from the content and the scope of the invention. Therefore, the invention is to be interpreted without limitation to the description in Embodiment Modes and the Example shown below. Note that, in the structure of the invention described hereinafter, the same reference numerals denote the same parts or parts having the similar functions in different drawings and the explanation will not be repeated.

Embodiment Mode 1

Figure 2A:
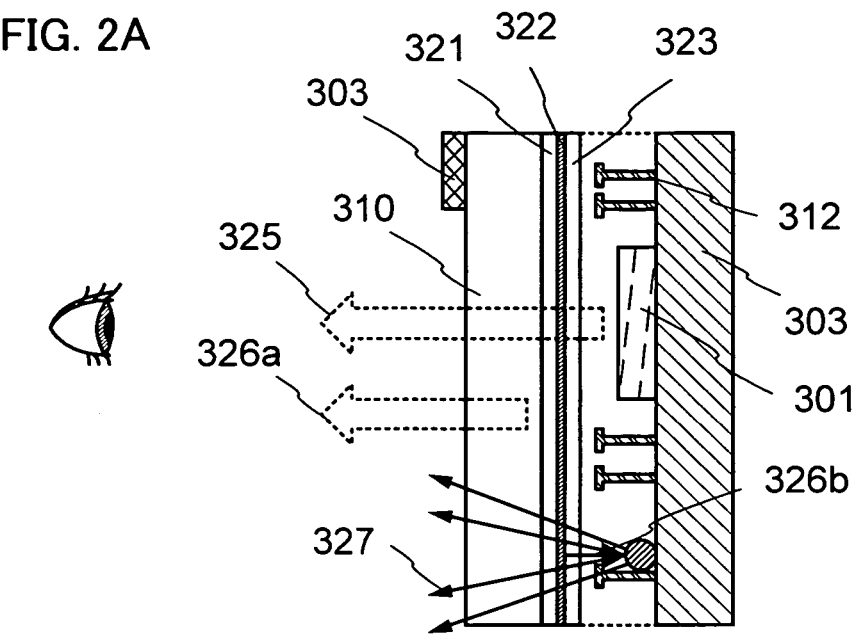
Figure 2A:
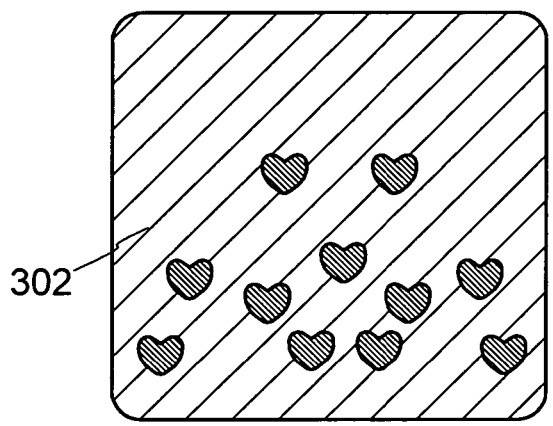
Figure 2A:
Figure 2C:
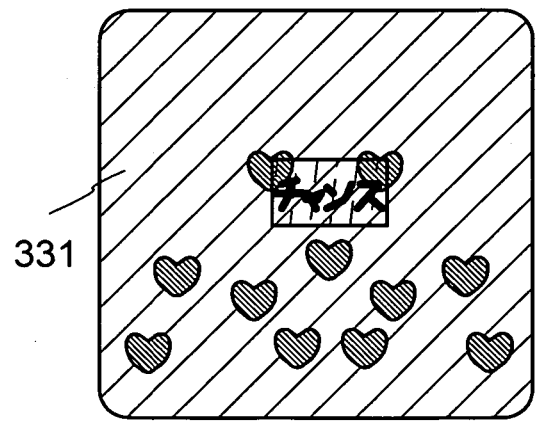
Figure 3:
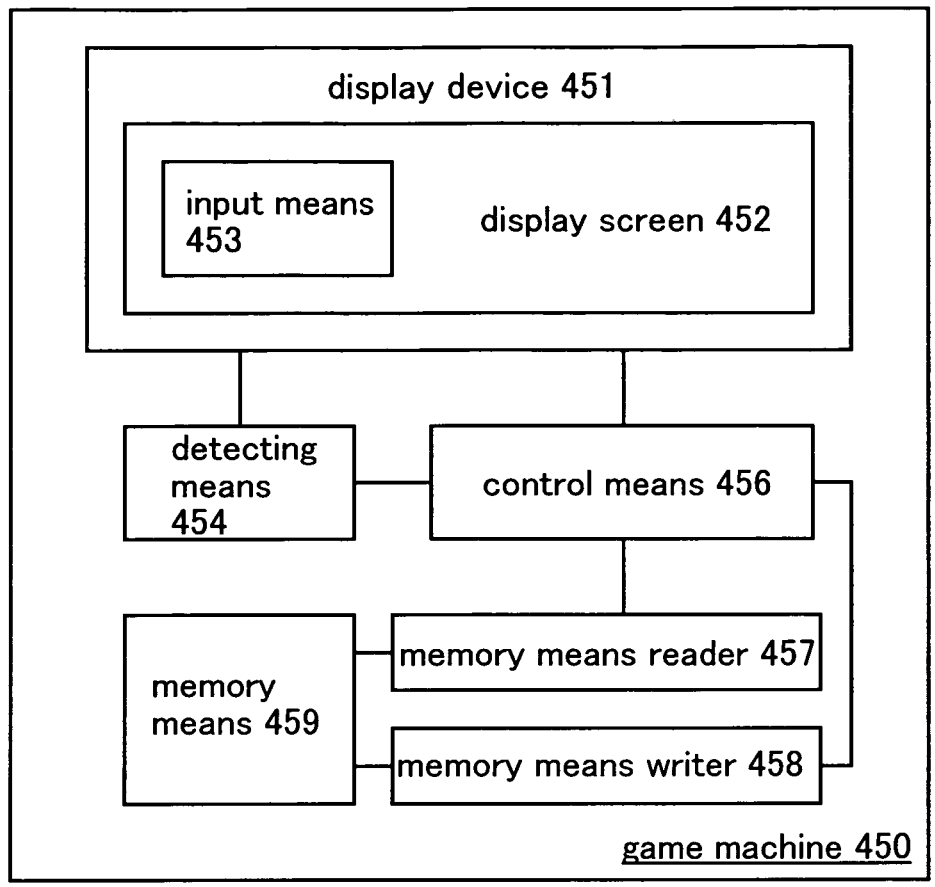
FIG. 3 is a view for explaining a game machine of the present invention.

A game machine in this embodiment mode is explained with reference to FIGS. 1 to 3. It is to be noted that in this embodiment mode, a pachinko machine is shown as an example of a game machine.

FIG. 1 is a front view of a game machine in this embodiment mode, and FIG. 2 is a vertical sectional view of the game machine. The game machine of this embodiment mode has a chassis 300, a display screen 301, a display screen 302, a game board 303, a display screen 305, a ball supply tray 306, a memory card port 307, a ball operating handle 308, a surplus ball receiving tray 309, a light transmitting substrate 310, a sensor 304 that is an input means, and a display screen 311 having an input means.

A display device having the display screen 302 is provided with the light transmitting substrate 310 has a layer 322 containing a light emitting material between a first light transmitting electrode 321 and a second light transmitting electrode 323. The sensor 304 which is an input means is provided at the player side of the light transmitting substrate 310. The nail 312, the display screen 301 is mounted to the game board 303 which is placed to be farthest from a player. In this specification, a transmitting property is a property of transmitting light with at least a wavelength of the visible light region.

The light transmitting electrode 323, the layer 322 containing a light emitting material, the light transmitting electrode 321, and the light transmitting substrate 310 have light transmitting properties, so that light 325 emitted from the display screen 301 and light 326a emitted from the display screen 302 reach the eye of a player without being intercepted. Therefore, the player can watch the display screen 302 placed at the front the display screen 301 shown in FIG. 2B1, and the display screen 301 placed behind the display screen 302 shown in FIG. 2B2, at the same time, and can watch an image as shown in FIG. 2C. The player can see a condition of the game board behind the display screen while enjoying an image on the display screen in front of the game board. A plurality of light transmitting display screens may be formed so as to overlap each other and a display screen can be also mounted to the game board. Therefore, various complicated images can be displayed. In the case where there are no image or condition which is to be seen through the display screens as in the case of the display screens 305 and 301, the display screen 305 does not need to have a light transmitting property. Therefore, the display screen 305 may be a non-light transmitting display device using a single emission type display device; thereby a game machine in which the player can see both of an image displayed on a light transmitting display screen and an image displayed on a non-light transmitting display screen can be provided. In addition, as details described below, a momentary bright light emission in a portion of the display screen is possible by raising the luminance of a high grayscale display region, thereby emission intensity in the portion of the display screen in corresponding to the information to be displayed.

In this embodiment mode, a metal ball called a pachinko ball is used for the game. A pachinko ball is a spherical ball made of metal and its surface is shiny and reflects light. In the game machine in this embodiment mode, the metal ball passes between the game board 303 and the display screen 302 which emits lights 326a and 326b from both sides to display images. The metal ball reflects the light 326b emitted from the display screen 302 with the surface. Therefore, the player sees the light 326a emitted to the player from the display screen 302 and the light 327 which is the light 326b reflected by the metal ball at the same time. Therefore, light emitted from the game machine is bright and has strong emission intensity. When a metal ball passes between the display screen 302 and the display screen 305, light emitted from the display screen 305 is added, so that light with stronger emission intensity is provided. In addition, the metal ball moves while colliding with obstructions provided with the game board. Then, the intensity and wave length of light emitted to the metal ball from the display screen change according to the location of the metal ball, and the intensity and wave length of reflected light from the metal ball also change. Therefore, the intensity and wave length of light emitted to the player changes every moment, which cause strong stimulation and visual pleasure to the player. It is to be noted that although a pachinko machine is given as an example of the game machine used in this embodiment mode as shown in FIG. 1, the present invention is not limited to the structure and the like of the game board. The game board 303 in FIG. 1 has a structure, in which a rail, along which the metal ball moves, is formed to the left of the player; however, the rail may be formed to the right of the player, so that the metal ball moves from the right side. In addition, a projection and the like may be mounted to the game board 303 so that the metal ball moves over the game board with complicated movement.

In this embodiment mode, the sensor is provided for the display screen as an input means. As the sensor, a sensor responding to light, heat, sound, or the like can be used. In this embodiment mode, a sensor having an image sensor function that reads information of an object is used. An example in which a sensor portion is provided to the display screen of the game machine is explained with reference to FIG. 11.

Figure 11:
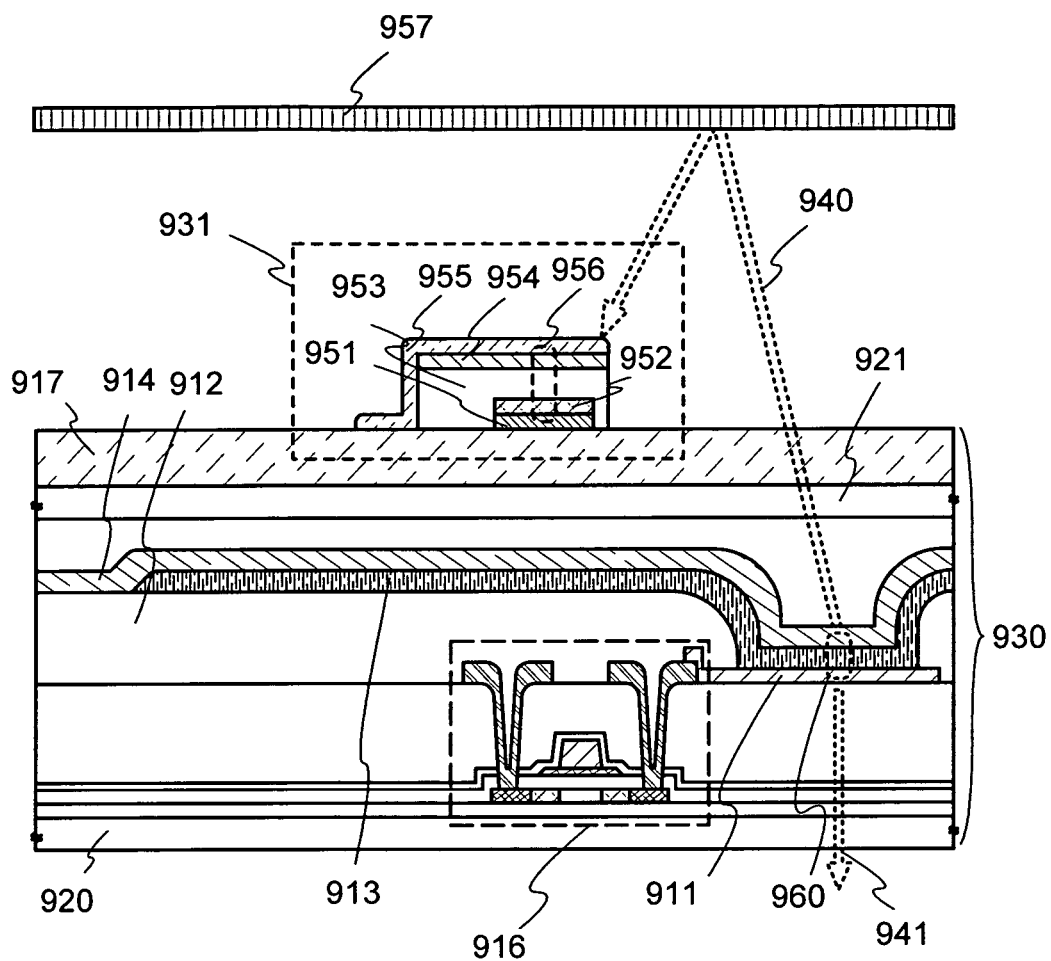
FIG. 11 is a view for explaining an input means which can be applied to a game machine of the present invention.

FIG. 11 shows a display device 930 having a light emitting element 960 forming a display screen and a sensor portion 931 formed thereover. In FIG. 11, the display device 930 has a transistor 916; an insulating layer 912; and a light emitting element 960 having a first light transmitting electrode 911, a layer containing a light emitting material 913, and a second light transmitting electrode 914; over a light transmitting substrate 920 and the display device 930 is sealed with a light transmitting substrate 921. A filling material may be filled in a space between the second light transmitting electrode 914 and the light transmitting substrate 921. The display device 930 is a dual emission type display device and light 940 and light 941 are emitted from the light emitting element 960. In addition, in FIG. 11, the sensor portion is formed over a light transmitting substrate 917 in the display device 930 and has a photoelectric conversion element 956 which is a lamination of a p-type layer 952, an i-type (intrinsic) layer 953, and an n-type layer 954; an electrode 951 connected to the p-type layer 952; and an electrode 955 connected to the n-type layer 954.

In this embodiment mode, the photoelectric conversion element 956 is used as a sensor element and the light emitting element 960 is used as a light source. Both of the light emitting element 960 and the photoelectric conversion element 956 are formed over the light transmitting substrate 920. The light 940 emitted from the light emitting element 960 is reflected by an object 957 such as a player, and then is received by the photoelectric conversion element 956. Then a difference in electric potential between the electrodes of the photoelectric conversion element 956 changes. In response to the change in the electric potential difference, a current flows between the two electrodes. Information of the object 957 can be obtained by detecting the amount of the current. And, the obtained information can be transmitted by being displayed with the light emitting element 960 and/or generating an alarm.

The light emitting element 960 can be a light source for reading information of an object and also can display an image. In addition, when an image sensor function is applied, a light source and a light scattering plate which are usually provided, are not necessary to be formed additionally, so that significant reduction of the thickness and the weight are possible.

It is to be noted that although the light emitting element and the photoelectric conversion element are formed over one substrate in a diagram in FIG. 11, the light emitting element and the photoelectric conversion element may be formed over different substrates. Although an active matrix type display device is shown, a passive matrix type display device may be used. In addition, although the light emitting element 960 and the photoelectric conversion element 956 are provided per pixel in FIG. 11, the photoelectric conversion element 956 is not necessarily provided in every pixel. The photoelectric conversion element 956 may be provided in every plurality of pixels depending on an object to be read and the intended use. In that case, an aperture ratio of the light emitting element 960 becomes higher, so that a bright image can be displayed when a display function is used.

The presence or absence of a player can be detected by the sensor 304. When there is a player, the display screen is used. When there is no player, the display screen can be stopped. Therefore, a player can easily find a vacant seat because its display screen does not display an image by emitting light. In addition, excess light emitting time of a display device can be shortened, so that deterioration of a light emitting device can be delayed and life-time of a display device can be extended, which results in efficient operation and low power consumption. Moreover, a player who touches or approaches the game machine to conduct a fraudulent act to intentionally cause a malfunction of the game machine is detected by the sensor 304. The game machine can warm of the fraudulent act by light emission with strong emission intensity from the display screen, an image for warning on the display screen, loud beep tones, and the like. In addition, a photograph of a suspicious individual can be taken, when the game machine is provided with an imaging means such as a camera in conjunction with the sensor 304.

Another input means may be provided in addition to the sensor 304. The display screen 311 having an input means has a touch panel as the input means with which the player can change a game state. For example, when an image on the display screen 311 is pressed, information is inputted by the input means. A game state is changed according to the information and the information is reflected on the display screen 302, the display screen 301, the display screen 305, and the like to change the image by a detection device for detecting the game state.

The game machine in this embodiment mode is explained with reference to a block diagram of FIG. 3. A game machine 450 has a display device 451 forming a display screen 452, an input means 453 in the display screen 452, a detecting means 454, a control means 456, a memory means 459, a memory means reader 457, and a memory means writer 458. The control means 456 changes a game state according to information inputted from the input means 453. The change is detected by the detecting means 454 and then an image on the display screen 452 of the display device 451 changes. In addition, the game machine in this embodiment mode has a memory means with which the player can store information of a game state so as to be able to continue the game later. The memory means may be formed in the game machine 450 like the game machine of FIG. 3. Alternatively, the memory means such as a memory card can be inserted by the player when the player plays the game machine like the game machine of FIG. 1. When the memory means is provided separately from the game machine, a large amount of data can be stored and information can be managed by an individual, which is preferable in the case where many players use one game machine. When the memory card which is the memory means 459 is inserted in the memory card port 307 as shown in FIG. 1, the memory means reader reads the information stored in the memory card, the information is transmitted to the display device 451 and display screen 452 by the control means, and then the information is displayed. When the player wants to write information as memory, the information is transmitted to the memory means by the memory means writer 458 to be stored. Thus, by providing a memory means, a player can take enough time for the game with no time restriction and enjoy the game whenever he/she likes.

A game machine of the present invention enables a player to enjoy one's own game with various stimulating images and various operating methods with the use of an input means shown on the display screen, thereby the player can be encouraged to play the game machine.

Embodiment Mode 2

In this embodiment mode, a display device in Embodiment Mode 1 having the display screen 302 through which an object placed behind can be seen is described in detail with reference to FIGS. 9A, 9B, and 13.

Figure 9A:
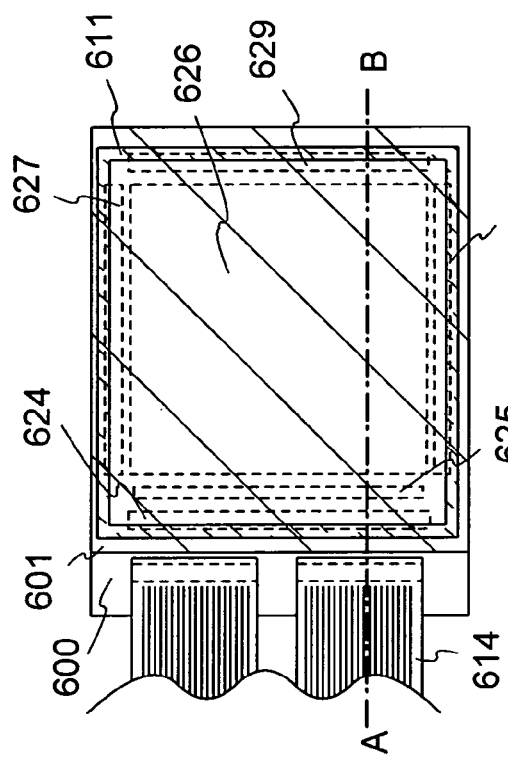
FIGS. 9A and 9B are view for explaining a display device in a game machine of the present invention.

FIG. 9A is a top view of a dual emission type light emitting display device. A peripheral driver circuit region 624 and a peripheral driver circuit region 629 each having a signal line driver circuit, a peripheral driver circuit region 627 and a peripheral driver circuit region 628 each having a scan line driver circuit, a pixel region 626, and a connecting region 625 are formed over a substrate 600 and sealed by a counter substrate 601 and a sealing material 611. In an external terminal connecting region, a terminal electrode layer 612 is connected to an FPC 614 through an anisotropic conductive layer 613 so as to be electrically connected to an external portion.

Figure 9B:
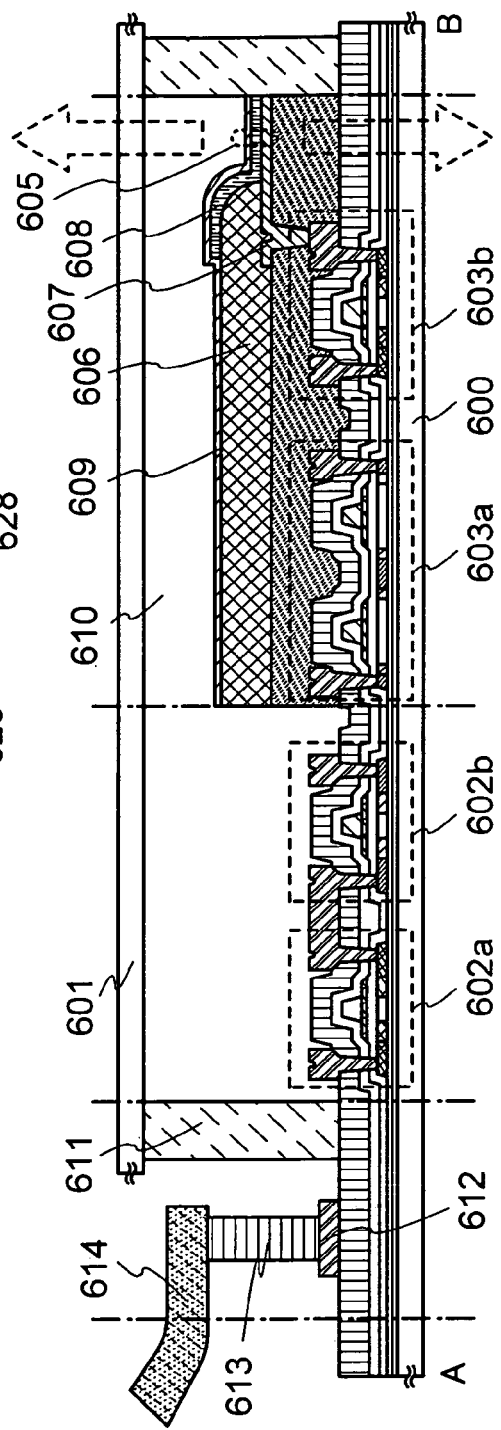

FIG. 9B is a cross-sectional view taken along a line A-B in FIG. 9A. A transistor 602a which is a p-channel thin film transistor and a transistor 602a which is an n-channel thin film transistor are formed in the peripheral driver circuit region. A transistor 603a which is an n-channel thin film transistor of multi-gate structure and a transistor 603b which is a p-channel thin film transistor are formed in a pixel region. The transistor 603b is electrically connected to a light emitting element 605 having a light transmitting electrode layer 607, a layer 608 containing a light emitting material, and a light transmitting electrode layer 609. An insulating layer 606 serves as a partition for separating each pixel region. A filling material 610 is filled in a space between the light transmitting electrode layer 609 and the counter substrate 601.

In a display device in FIG. 9, a material used in a pixel region contributing to display needs to have a light transmitting property to provide a display device through which an object placed behind can be seen. Therefore, a light transmitting material is also used for the electrode and the light emitting material of the light emitting element; and an insulating layer and a substrate in a region through which light passes. However, in a region which does not contribute to display, a material does not necessarily have a light transmitting property. In a pixel region, a color filter or a color conversion layer may be used to transmit light selectively to display various images.

A transparent conductive film may be used for the light transmitting electrode layer 607 and the light transmitting electrode layer 609. Specifically, indium tin oxide (ITO), indium zinc oxide (IZO), indium tin oxide doped with silicon oxide (ITSO), or the like can be used. Further, a metal film can be used since light can be transmitted through the light transmitting electrode layers 607 and 609 by forming a thin metal film (preferably, about 5 to 30 nm). A thin metal film containing titanium, tungsten, nickel, gold, platinum, silver, aluminum, magnesium, calcium, or lithium, a metal thin film containing an alloy of the metals, or the like can be used for the light transmitting electrode layers 607 and 609.

The layer 608 containing a light emitting material has a layer having each function such as a hole injecting layer, a hole transporting layer, a light emitting layer, an electron transporting layer, and an electron injecting layer. A boundary of each layer is not always distinct and a portion thereof may be mixed. As a material of a layer containing a light emitting material, an organic material (including low molecular weight compound or high molecular weight compound), an inorganic material or a composite material of an organic material and an inorganic material can be used. The material of the layer containing the light emitting material is described in detail hereinafter.

As a material having a high electron transporting property among charge injecting/transporting substances, for example, a metal complex having a quinoline skeleton or a benzoquinoline skeleton can be given, such as tris(8-quinolinolato)aluminum (abbreviation: $Alq_3$), tris(5-methyl-8-quinolinolato)aluminum (abbreviation: $Almq_3$), bis(10-hydroxybenzo[h]-quinolinato)beryllium (abbreviation: $BeBq_2$), and bis(2-methyl-8-quinolinolato)-4-phenylphenolato-aluminum (abbreviation: BAlq). As a material having a high hole transporting property, for example, an aromatic amine based compound (that is, a compound having a bond of benzene ring-nitrogen) can be given, such as 4,4'-bis[N-(1-naphthyl)-N-phenyl-amino]-biphenyl (abbreviation: α-NPD), 4,4'-bis[N-(3-methylphenyl)-N-phenyl-amino]-biphenyl (abbreviation: TPD), 4,4',4"-tris(N,N-diphenyl-amino)-triphenylamine (abbreviation: TDATA), and 4,4',4"-tris[N-(3-methylphenyl)-N-phenyl-amino]-triphenylamine (abbreviation: MTDATA).

As a material having a particularly high electron injecting property among charge injecting/transporting materials, a compound of an alkali metal or an alkaline earth metal can be given, such as lithium fluoride (LiF), cesium fluoride (CsF), and calcium fluoride ($CaF_2$). In addition, a mixture of a material having a high electron transporting property such as $Alq_3$ and an alkaline earth metal such as magnesium (Mg) may be used.

As a material having a high hole injecting property among charge injecting/transporting materials, for example, a metal oxide can be given, such as molybdenum oxide ($MoO_x$), vanadium oxide ($VO_x$), ruthenium oxide ($RuO_x$), tungsten oxide ($WO_x$), and manganese oxide ($MnO_x$). In addition, a phthalocyanine based compound can be given, such as phthalocyanine (abbreviation: $H_2Pc$) and copper phthalocyanine (CuPc).

The light emitting layer may have a structure in which light emitting layers having different emission wavelength ranges is formed in each pixel to perform color display. Typically, light emitting layers corresponding to each of the colors of R (red), G (green), and B (blue) are formed. In this case, color purity can be improved and specular reflection (reflection) of a pixel region can be prevented by providing a filter which transmits light of an emission wavelength band over the light emitting side of the pixel. By providing the filter, a circular polarizer or the like which is conventionally required can be omitted, and the loss of light emitted from the light emitting layer can be eliminated. Further, a change in color tone, which occurs when a pixel portion (display screen) is obliquely seen can be reduced.

Various materials can be used for the layer containing the light emitting substance. As a low molecular weight organic light emitting material, 4-(dicyanomethylene)-2-methyl-6-[2-(1,1,7,7-tetramethyljulolidin-9-yl)ethenyl]-4H-pyran (abbreviation: DCJT); 4-(dicyanomethylene)-2-t-butyl-6-[2-(1,1,7,7-tetramethyljulolidin-9-yl)ethenyl)]-4H-pyran (abbreviation: DCJTB); periflanthene; 2,5-dicyano-1,4-bis[2-(10-methoxy-1,1,7,7-tetramethyljulolidine-9-yl)ethenyl]benzene; N,N'-dimethylquinacridon (abbreviation: DMQd); coumarin 6; coumarin 545T; tris(8-quinolinolato)aluminum (abbreviation: $Alq_3$); 9,9'-bianthryl; 9,10-diphenylanthracene (abbreviation: DPA); 9,10-bis(2-naphthyl)anthracene (abbreviation: DNA); and the like can be used. Other materials can also be used.

On the other hand, a high molecular weight organic light emitting material is physically stronger than a low molecular weight material and an element with high durability can be formed. In addition, a film of a high molecular weight organic light emitting material can be formed by coating; therefore, the element can be manufactured relatively easily. A light emitting element using a high molecular weight organic light emitting material has basically the same structure as that of the light emitting element using a low molecular weight organic light emitting material, where, a cathode, a light emitting layer, and an anode are sequentially stacked. However, when a light emitting layer is formed using a high molecular weight organic light emitting material, a stacked structure such as the case of using a low molecular weight organic light emitting material is difficult to form; therefore, a two-layer structure is employed in many cases. Specifically, a structure where a cathode, a light emitting layer, a hole transporting layer, and a cathode are sequentially stacked is employed.

Since an emission color is determined depending on a material forming a light emitting layer, a light emitting element which provides a desired emission color can be obtained by selecting a material for the light emitting layer. As a high molecular weight electroluminescent material which can be used for forming a light emitting layer, a polyparaphenylenevinylene based material, a polyparaphenylene based material, a polythiophene based material, and a polyfluorene based material can be given.

As the polyparaphenylene vinylene based material, a derivative of poly(paraphenylenevinylene) [PPV] can be given, such as poly(2,5-dialkoxy-1,4-phenylenevinylene) [RO-PPV], poly(2-(2'-ethyl-hexoxy)-5-methoxy-1,4-phenylenevinylene) [MEH-PPV], and poly(2-(dialkoxyphenyl)-1,4-phenylenevinylene) [ROPh-PPV]. As the polyparaphenylene based material, a derivative of polyparaphenylene [PPP] can be given, such as poly(2,5-dialkoxy-1,4-phenylene) [RO-PPP] and poly(2,5-dihexoxy-1,4-phenylene). As the polythiophene based material, a derivative of polythiophene [PT] can be given, such as poly(3-alkylthiophene) [PAT], poly(3-hexylthiophen) [PHT], poly(3-cyclohexylthiophen) [PCHT], poly(3-cyclohexyl-4-methylthiophene) [PCHMT], poly(3,4-dicyclohexylthiophene) [PDCHT], poly [3-(4-octylphenyl)-thiophene] [POPT], and poly[3-(4-octylphenyl)-2,2 bithiophene] [PTOPT]. As the polyfluorene based material, a derivative of polyfluorene [PF] can be given, such as poly(9,9-dialkylfluorene) [PDAF] and poly(9,9-dioctylfluorene) [PDOF].

It is to be noted that when a high molecular weight organic light emitting material having a hole transporting property is interposed between an anode and a high molecular weight organic light emitting material, a hole injecting property from the anode can be improved. In general, the high molecular weight organic light emitting material having a hole transporting property which is dissolved in water with an acceptor material is applied by a spin coating method or the like. In addition, the high molecular weight light emitting material is insoluble in an organic solvent; therefore, it can be stacked over the organic light emitting material mentioned above. As the high molecular weight organic light emitting material having a hole transporting property, a mixture of PEDOT and camphorsulfonic acid (CSA) which serves as an acceptor material, a mixture of polystyrene sulfonic acid [PSS] which serves as an acceptor material and polyaniline [PANI], and the like can be given.

The light emitting layer can have a structure from which a single color or white-light can be emitted. When a white-light emitting material is used, color display can be achieved by employing a structure where a filter (a color layer) which transmits light of a specific wavelength is provided over the light emitting side of the pixel.

In order to form a light emitting layer which emits white-light, for example, $Alq_3$, $Alq_3$ partially doped with Nile red that is a red light emitting pigment, $Alq_3$, p-EtTAZ, and TPD (aromatic diamine) may be sequentially stacked by a vapor deposition method. In the case where EL is formed by spin coating, the layer is preferably heated under vacuum after coating. For example, the entire surface may be coated with an aqueous solution of poly(ethylene dioxythiophene)/poly(styrenesulfonic acid) (PEDOT/PSS) and baked to form a film serving as a hole injecting layer. Then, the entire surface may be coated with a polyvinyl carbazole (PVK) solution doped with a luminescent center pigment (1,1,4,4-tetraphenyl-1,3-butadiene (TPB), 4-dicyanomethylene-2-methyl-6-(p-dimethylamino-styryl)-4H-pyran (DCM1), Nile red, coumarin 6, or the like), and baked to form a film serving as a light emitting layer.

The light emitting layer may be formed to be a single layer. For example, a 1,3,4-oxadiazole derivative (PBD) having an electron transporting property may be dispersed in polyvinyl carbazole (PVK) having a hole transporting property. Further, white-light emission can be obtained by dispersing PBD of 30 wt % as an electron transporting agent and by dispersing an appropriate amount of four kinds of pigments (TPB, coumarin 6, DCM1, and Nile red). In addition to the foregoing light emitting elements which give white-light emission, a light emitting element that gives red light emission, green light emission, or blue light emission can be manufactured by appropriately selecting a material for the light emitting layer.

Further, a triplet excitation light emitting material such as a metal complex as well as a singlet excitation light emitting material may be used for the light emitting layer. For example, among pixels emitting red light, green light, and blue light, a pixel emitting red light of which half-life period of the luminance is relatively short is formed from a triplet excitation light emitting material and the rest are formed from a singlet excitation light emitting material. A triplet excitation light emitting material has characteristics of good luminous efficiency and consuming less power to obtain the same luminance. That is, when a triplet excitation light emitting material is used for a pixel emitting red light, only a small amount of current needs to flow to a light emitting element, so that the reliability can be improved. In order to provide a light emitting element with low power consumption, pixels emitting red light and green light may be formed from a triplet excitation light emitting material and a pixel emitting blue light may be formed from a singlet excitation light emitting material. Lower power consumption can be achieved by using a triplet excitation light emitting material for a light emitting element that emits green light, which is highly visible to the human eye.

As an example of a triplet excitation light emitting material, a material using a metal complex as a dopant is known, and for example, a metal complex having platinum which is a third transition series element as a central metal, and a metal complex having iridium as a central metal is given. A triplet excitation light emitting material is not limited to these compounds, and it is also possible to use a compound having the foregoing structure and an element having a central metal belonging to any of the Groups 8 to 10 of the periodic table.

The foregoing materials for forming the layer containing a light emitting material are just examples. A layer containing a light emitting material may be formed by appropriately stacking functional layers such as a hole injecting/transporting layer, a hole transporting layer, an electron injecting/transporting layer, an electron transporting layer, a light emitting layer, an electron blocking layer, and a hole blocking layer. Further, a mixed layer or a mixed junction may be formed by combining these layers. The structure of the layer containing light emitting material can be varied. Instead of having a specific electron injecting region or a light emitting region, an electrode layer used as an electron injecting region or a light emitting region or a layer dispersed light emitting material may be provided unless such modifications depart from the scope of the present invention.

The insulating material to be used for a display device of this embodiment mode are selected from silicon oxide, silicon nitride, silicon oxynitride, silicon nitride oxide, aluminum nitride (AlN), aluminum oxynitride (AlON), aluminum nitride oxide (AlNO) containing more nitrogen than oxygen, aluminum oxide, diamond-like carbon (DLC), a carbon nitride film (CN), PSG (phosphorus glass), BPSG (boron phosphorus glass) an alumina film, polysilazane, or other material containing an inorganic insulating material. Further, a siloxane resin may be used as well. It is to be noted that a siloxane resin is a resin having an Si—O—Si bond. Siloxane has a skeleton of a bond of silicon (Si) and oxygen (O). As a substituent, an organic group having at least hydrogen (such as an alkyl group and an aromatic carbon hydride) or a fluoro group may be used. Alternatively, both an organic group containing at least hydrogen and a fluoro group may be used as a substituent. Further, a photosensitive or a nonphotosensitive organic insulating material may be used, such as polyimide, acrylic, polyamide, polyimide amide, or benzocyclobutene, or a low-k material that is a low dielectric constant can be used.

It is effective to provide a light transmitting passivation film so as to cover the light transmitting electrode layer 609. The passivation film may be formed of a single layer or stacked layers of an insulating film containing silicon nitride, silicon oxide, silicon oxynitride (SiON), silicon nitride oxide (SiNO), aluminum nitride (AlN), aluminum oxynitride (AlON), aluminum nitride oxide (AlNO) containing more nitrogen than oxygen, aluminum oxide, diamond-like carbon (DLC), or a carbon nitride film (CN). Moreover, the foregoing siloxane resin may be used as well.

At this time, it is preferable to form a passivation film with favorable coverage, and a carbon film, particularly a DLC film is effective to use. A DLC film which can be formed in the temperature range from room temperature to 100° C. can be easily formed over the layer containing a light emitting material which has low heat resistance. A DLC film can be formed by a plasma CVD method (typically an RF plasma CVD method, a microwave CVD method, an electron cyclotron resonance (ECR) CVD method, a heat filament CVD method and the like), a combustion method, a sputtering method, an ion beam vapor deposition method, a laser vapor deposition method and the like. As a reactive gas to be used for forming the film, a hydrogen gas and a carbon hydride based gas (for example, $CH_4$, $C_2H_2$, $C_6H_6$ and the like) are used to be ionized by glow discharge and the ions are accelerated to collide against a cathode to which a negative self-bias voltage is applied. Further, a CN film may be formed using a $C_2H_4$ gas and a $N_2$ gas as a reactive gas. A DLC film has a high blocking effect against oxygen, thereby oxidization of the layer containing a light emitting material can be suppressed. Therefore, a problem that the layer containing a light emitting material is oxidized while conducting a subsequent sealing step can be prevented.

As the sealing material 611, it is typically preferable to use a visible light curable resin, an ultraviolet ray curable resin, or a heat curable resin. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an epi-bis type epoxy resin, a glycidyl ester resin, a glycidyl amine resin, heterocyclic epoxy resin, and a modified epoxy resin can be used. It is to be noted that a region surrounded by a sealing material may be charged with nitrogen by sealing in a nitrogen atmosphere instead of the filling material 610. The filling material 610 needs to have a light transmitting property. Typically, a visible light curable epoxy resin, an ultraviolet ray curable epoxy resin, or a heat curable epoxy resin may be used. Further, the filling material may be filled in the display device by dropping a filling material in a liquid state.

As a substrate used in this embodiment mode, a light transmitting substrate such as a glass substrate, a quartz substrate, or a silicon substrate can be used. In addition, a substrate which can be bent (a flexible substrate) such as a plastic substrate formed from polycarbonate, polyarylate, polyether sulfone, or the like can be also used. Alternatively, a film (formed from polypropylene, polyester, vinyl, polyvinyl fluoride, polyvinyl chloride, or the like), a paper having a fibrous material (which has a light transmitting property), a film (such as polyester, polyamide, an inorganic deposition film, paper, or the liker), or the like can be used.

A conductive material which can be used for the display device of this embodiment mode may be an element selected from Ag, Au, Cu, Ni, Pt, Pd, Ir, Rh, W, Al, Ta, Mo, Cd, Zn, Fe, Ti, Si, Ge, Zr, Ba, and the like; or an alloy material or a compound material which has the foregoing elements as a main component. Alternatively, a mixture having the foregoing elements may be used.

As an example of a forming method of an insulating layer or conductive layer using the foregoing materials, a vapor deposition method, a PVD method, a CVD method, a plasma-CVD method, a sputtering method, a printing method, a spray method, a spin coating method, and a droplet discharge method can be given. When the insulating layer or the conductive layer needs to be processed to a desired shape, a dry etching method or a wet etching method may be conducted using a mask. The conductive layer may be formed by an electroplating method, an electroless plating method, a reflow method, a damascene method, or the like.

The transistor may have any kind of structure as long as it has a function needed. The semiconductor layer is also formed of various semiconductors such as an noncrystalline semiconductor (amorphous semiconductor), a crystalline semiconductor, a polycrystalline semiconductor, and a microcrystal semiconductor (semiamorphous semiconductor). In addition, an organic transistor can be formed by using an organic compound such as pentacene.

As an example of a typical noncrystalline semiconductor, hydrogenated amorphous silicon can be given while polysilicon or the like can be given as an example of a crystalline semiconductor. Polysilicon (polycrystalline silicon) includes a so-called high temperature polysilicon formed using polysilicon as a main material which is formed at a processing temperature of 800° C. or higher; a so-called low temperature polysilicon formed using polysilicon as a main material which is formed at a processing temperature of 600° C. or lower: polysilicon crystallized by adding an element which promotes crystallization, and the like. It is needless to say that a semiconductor having a crystal phase in a portion thereof may be used.

In this embodiment mode, an example in which a thin film transistor of a planar structure of a top gate structure is formed over an insulating substrate is shown, but a transistor can be formed with a structure such as a staggered type or an inversely staggered type of a bottom gate structure. The present invention is not limited to this embodiment mode and a thin film transistor may have a single gate structure in which one channel forming region is formed, a double gate structure in which two channel forming regions are formed, or a triple gate structure in which three channel forming regions are formed. In addition, a thin film transistor in the peripheral driver circuit region may have a single gate structure, a double gate structure, or a triple gate structure. Alternatively, a dual gate structure in which two gate electrode layers, one of them is formed over a channel region via a gate insulating film over the channel region and the other is provided beneath the channel region via a gate insulating film beneath the channel region, or other structures can be employed.

A transistor shown in FIG. 9 in this embodiment mode is formed from a crystalline semiconductor. Over a semiconductor layer, a gate electrode layer is formed via a gate insulating layer. The gate electrode layer may have a single layer structure or a stacked structure. An impurity region is formed in the semiconductor layer by doping the semiconductor layer with an impurity element. An impurity region can be formed to be a high concentration impurity region or a low concentration impurity region by controlling the concentration of the impurity element contained in the region. A structure of a thin film transistor (hereinafter also referred to as a TFT) having a low concentration impurity region is referred to as an LDD (Lightly doped drain) structure. The low concentration impurity region can be formed to overlap a gate electrode and a structure thereof is referred to as GOLD (Gate Overlapped LDD) structure. In this embodiment mode, each of a transistor 602a, a transistor 602b, and a transistor 603b has a GOLD structure. An n-type TFT is formed by adding phosphor (P) in an impurity region while a p-type TFT is formed by adding boron (B) in an impurity region.

Figure 13:
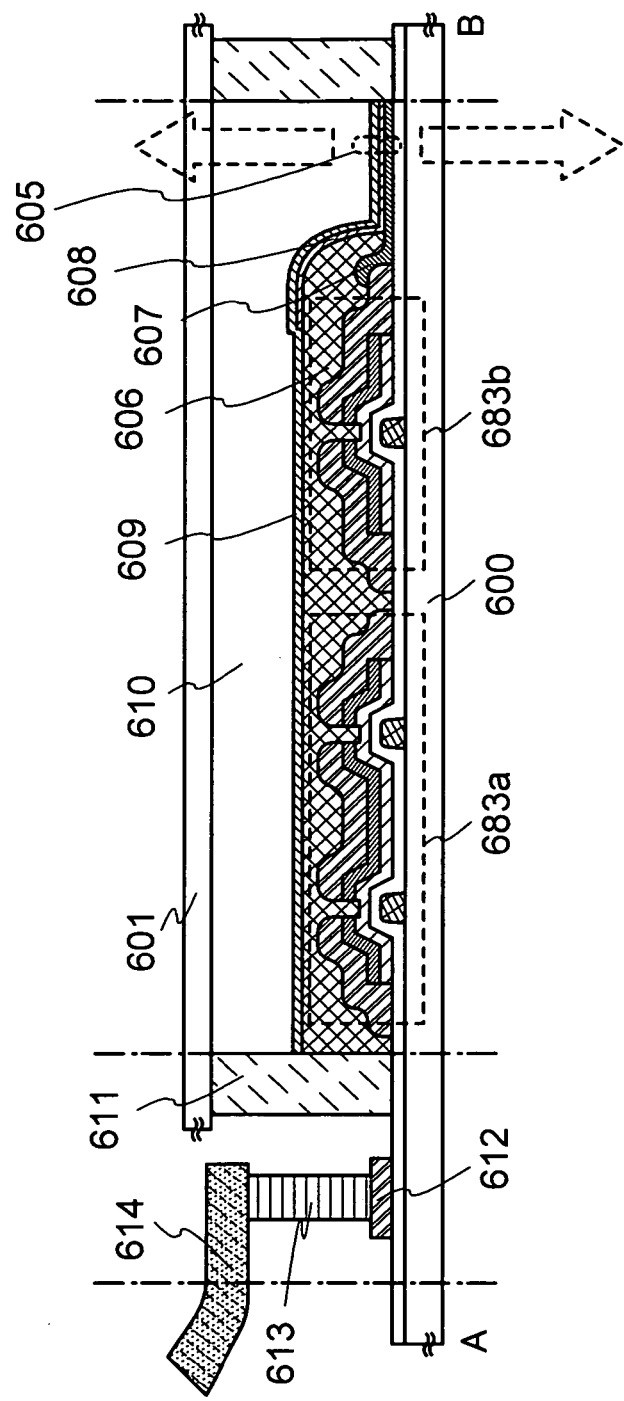
FIG. 13 is a cross sectional view of a display device of a game machine of the present invention.

In FIG. 13, a cross-sectional view of an example of a display device having a transistor with a semiconductor layer containing a noncrystalline semiconductor is shown. FIG. 13 is an example of a display device where the transistor 603a, and the transistor 603b in FIG. 9B are replaced by a transistor 683a and a transistor 683b, respectively. Other parts of the display device are similar to that of the display device shown in FIG. 9B. The transistor 683a and the transistor 683b are thin film transistors each having an inversely staggered structure including a noncrystalline silicon film which is a noncrystalline semiconductor as a semiconductor layer. In each of the transistors 683a and 683b, a semiconductor layer having one conductivity type which function as a source region or a drain region are provided. As the semiconductor layer having one conductivity type, each of the transistors 683a and 683b which has a semiconductor layer having phosphor as an impurity element applying n-type, and is an n-channel type thin film transistor. On the other hand, as the semiconductor layer having one conductivity type, when the TFT has a semiconductor layer containing boron as an impurity element applying p-type, a p-channel type thin film transistor can be formed. Alternatively, as shown in FIG. 13, the structure in which an interlayer insulating layer is not provided can be employed.

In this embodiment mode, a circuit described above is used. However, the present invention is not limited thereto. A circuit having an IC chip mounted by the foregoing COG method or a TAB method can be used as the peripheral driver circuit. In addition, one or a plurality of the gate line driver circuit and the source line driver circuit may be provided.

In the display device of the present invention, a driving method for an image display is not particularly limited, and a dot sequential driving method, a line sequential driving method, an area sequential driving method and the like may be used. Typically, the line sequential driving method may be used, and a time division grayscale driving method and an area grayscale driving method may be appropriately used as well. In addition, a video signal inputted to the source line of the display device may be an analog signal or a digital signal. The driver circuit and the like may be appropriately designed according to the video signal.

A display device using a digital video signal employs a constant voltage (CV) or a constant current (CC) video signal to be inputted to a pixel. The video signal with a constant voltage (CV) includes a video signal with a constant voltage applied to a light emitting element (CVCV) and a video signal with a constant current applied to a light emitting element (CVCC). The video signal with a constant current (CC) includes a video signal with a constant voltage applied to a light emitting element (CCCV) and a video signal with a constant current applied to a light emitting element (CCCC).

When the game machine has a display device as shown in FIG. 9 in this embodiment mode, through which an object placed behind can be seen, a player can see the game board behind the display screen while enjoying an image on the display screen. A plurality of display screens may be provided to overlap each other and a display screen can be also mounted to the game board. Therefore, various complicated images can be displayed. The game machine of the present invention enables the player to enjoy one's own game with various stimulating images and various operating methods with the use of an input means shown on the display screen; thereby the player can be encouraged to play the game machine.

Embodiment Mode 3

A game machine in this embodiment mode is explained with reference to FIGS. 4A and 4B. In this embodiment mode, a slot machine is shown as an example of a game machine.

Figure 4A:
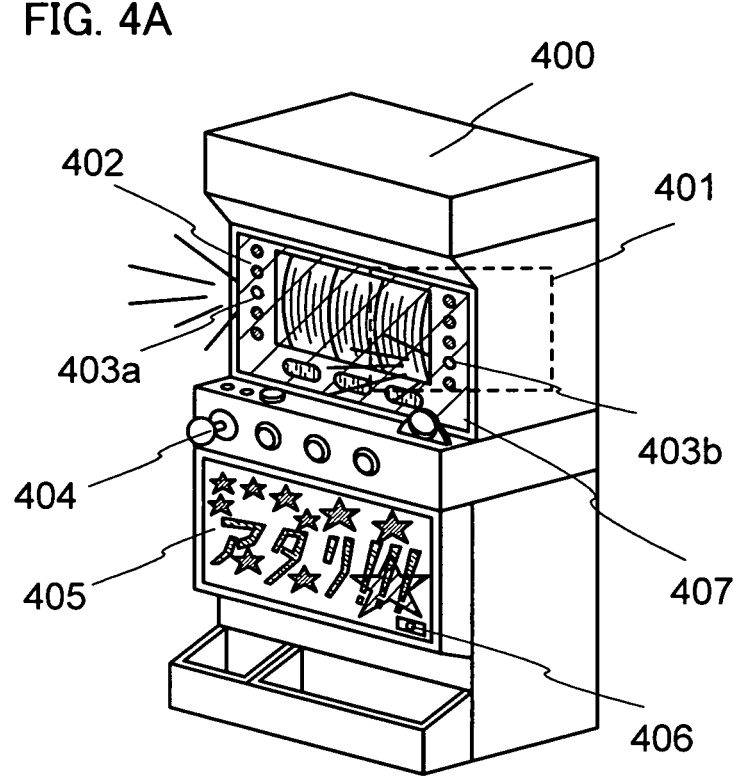
FIGS. 4A and 4B are views for explaining a game machine of the present invention.

A game machine in this embodiment mode has a chassis 400, a display portion 401, a display screen 402 having an image 403a and an image 403b, a touch panel 407 which is an input means, an operating handle 404, a display screen 405, and a camera 406 (FIG. 4A).

In the present invention, any kind of input means may be used as long as information shown on a display screen can be inputted to a game machine. A touch panel can be used as an input means. A touch panel includes several types of touch panels such as an optical type, an ultrasonic type, a capacitive type, an electromagnetic induction type, an image recognition method, and a resistive film type. In an optical type touch panel, light emitting diodes (LED) are mounted over one horizontal side and one vertical side of the panel and a light (infrared ray) is applied in an array of rows and columns and the position in which the light is interrupted is detected. In an ultrasonic type touch panel, a surface acoustic wave is generated by an ultrasonic vibrator. The change in the surface acoustic wave is analyzed to find the center of the change generated when the touch panel is touched. In a capacitive type touch screen, a change in electrical charge generated on the surface of the panel when a finger or the like touches the surface of the panel is detected. In an electromagnetic induction type touch panel, a special tool (such as a pen) which can generate a magnetic field when touching the panel can be used. The touch panel receives the electromagnetic energy so that the location of the pen is detected. In a touch panel of an image recognition method, a picture of the touch panel is taken by a camera disposed near the touch panel. The picture is detected so that a contact is confirmed and the contact location is detected. In a resistive film type touch panel, a resistive film is interposed between electrodes. When the touch panel is touched by finger or the like, the electrodes which are placed in an array of rows and columns contact to each other to lead a current flow and the position is detected by the electrical signal therefrom.

Figure 10A:
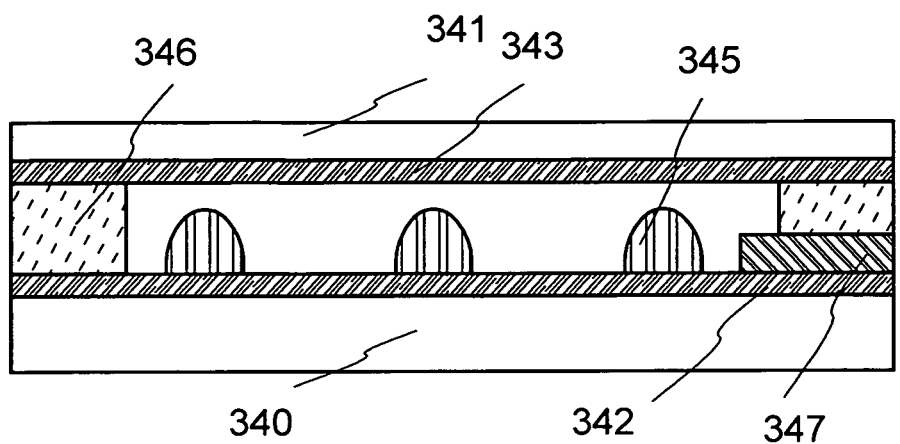
FIGS. 10A and 10B are views for explaining an input means which can be applied to a game machine of the present invention.
Figure 10B:
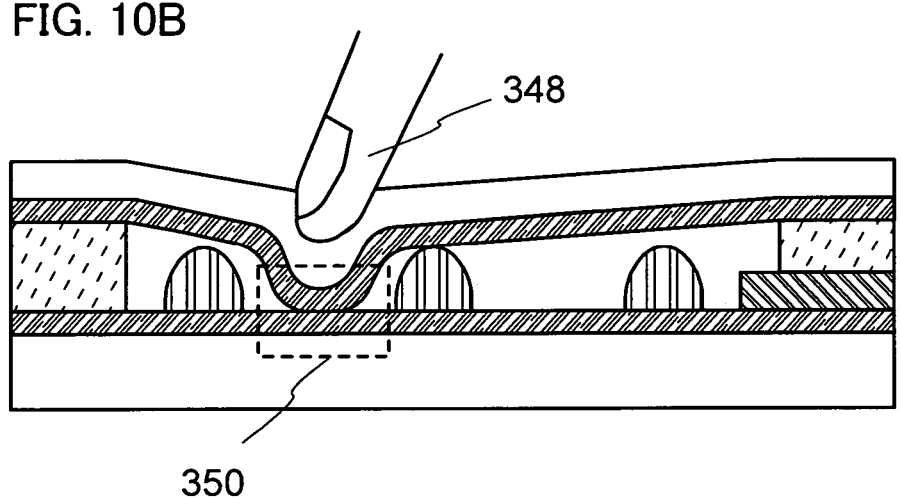

The present invention may use any one of the foregoing input means. In this embodiment mode, a resistive film type touch panel is used as an input means. A cross sectional view of the input means to be used in this embodiment mode is shown in FIGS. 10A and 10B. In a touch panel 407 which is an input means, an electrode layer 342 and a dot spacer 345 is mounted over a light transmitting substrate 340 while an electrode layer 343 is mounted over a counter light transmitting substrate 341. The light transmitting substrates 340 and 341 are attached by the sealing material 346, which is a bonding agent, so that the electrode layers face each other (FIG. 10A). A wiring layer 347 is connected to an external circuit. The light transmitting substrate 340 is a flexible substrate such as a film and its shape is changed by a pressure added by a finger 348 of a player as shown in FIG. 10B. The shape of the electrode layer 343 is also changed due to the shape change of the light transmitting substrate 340, and the electrode layer 343 comes in contacted with the electrode layer 342 to lead a current flow. A region 350 is detected by the electrical signal therefrom.

In this embodiment mode, a screen display 402 and a screen display 405 have a light transmitting property as in the case of the screen display 301 in Embodiment Mode 1. Since the touch panel 407 also has a light transmitting property, light emitted from the display screen 402 and light emitted from the display portion 401 reach a player without being intercepted. Therefore, the player can watch the display screen 402 and the display portion 401 placed behind the display screen 402 at the same time. The player can see the display portion behind the display screen while enjoying an image on the display screen. A plurality of light transmitting display screens may be provided to overlap each other so that various complicated images can be displayed.

The game machine in this embodiment mode has the camera 406 behind the screen 405. The camera 406 can take a picture of both of an image on the display screen 405 and the player. The player can operate the camera 406 by an input means to take a picture when a memorable event happens, for example, the player may take a picture when he/she wins. In addition, a picture taken with the camera 406 may be displayed on the display screen 402.

In addition, the display screen is provided with an input means with which the player can change a game state. For example, when the image 403a shown on the display screen 402 is pressed, information is inputted by the input means. A game state changes depending on the information. Then the information is reflected to the display screens 402 and 405 or the like by a detection device to detect a game state, so that an image is changed. In addition, a game machine of this embodiment mode is a slot machine in which a player stops three changing images displayed on the display portions 401 at any arbitrary time and attempts to match the three images to a certain pattern. By moving and fixing an operating means (such as an operation button) which is usually fixed, a range of degree in difficulty is extended to select a setting which is suitable for the player. In addition, a plurality of operating means can be mounted to the display screen which only has stopping and moving options available, therefore, options for an operation speed of the image, brightness of the display screen, and the like can be added to be chosen freely by a player anytime in the game. Therefore, the player gets a stronger stimulation and excitement. In addition, as details described below, a momentary bright light emission of a part of the display screen is possible by raising the luminance of a high grayscale display region and emission intensity of the part of the display screen corresponding to the information to be displayed.

In addition to a touch panel, another input means such as a sensor shown in Embodiment Mode 1 may be provided. By using an input means like a sensor, a condition around the game machine and condition of a player can be detected. Therefore, the use efficiency of the game machine can be increased and security control for preventing fraudulent acts can be conducted.

Figure 4B:
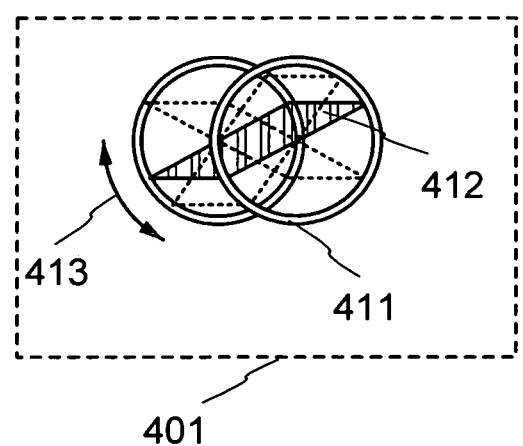

In addition, in the game machine in this embodiment mode, a rotation starting means and a rotation stopping means are provided in the display portion 401 and the display portion 401 rotates as shown in FIG. 4B. Details of the display portion 401 is shown in FIG. 4B. The display portion 401 has the display device 412 having a display screen and support body 411 to turn the display device 412 by a rotating means and the display device 412 rotates as shown by an arrow 413. In this embodiment mode, the display screen in the display device 412 has a light transmitting property, and various images are displayed. An image is displayed and changed on the display screen in accordance with the angle of the rotation of the display device 412 so that a three-dimensional image can be displayed on the display portion 401. Therefore, the player can see a two-dimensional image displayed on the display screen 402 and a three-dimensional image displayed by the display portion 401 at the same time, so that the player can enjoy the game with a powerful and realistic image. The display device 412 of the display portion 401 is stopped at any arbitrary time by the player, so that the two-dimensional image is displayed and the player can see the selected image.

When the display device is a dual emission type display panel which emits light from both faces to display an image, only one display device (display panel) is needed. In such a case, the display device can be lightweight, and there is an advantage such as that an electric power to rotate the display device 412 can be reduced, and the display device 412 can be rotated by wind power. In addition, in a dual emission type display device, two screens can be driven by one display device (display panel) with low power consumption.

In addition, as long as the display device 412 is a dual emission type display device which displays an image on both faces of a screen, a non-light transmitting display may be used. Alternatively, two single emission type display devices which are attached to each other with the surfaces which do not emit light can be used as a dual emission type display device. When two single emission type display devices are attached to each other, it is necessary to be attached with high accuracy.

The game machine of the present invention enables the player to enjoy one's own game with various stimulating images and various operating methods with the use of an input means shown on the display screen; thereby encouraging the player to play the game machine.

Embodiment Mode 4

A game machine in this embodiment mode is explained with reference to FIG. 5. It is to be noted that in this embodiment mode, a pachinko machine is shown as an example of a game machine.

A game machine with variety is exciting for a player and with such a game machine, the player does not get bored. However, it is impossible to change a game board or the entire main body of a game machine frequently because of the cost. In this embodiment mode, an outer package of the game machine is changed like changing clothes to encourage a player to play the game machine.

Figure 5A:
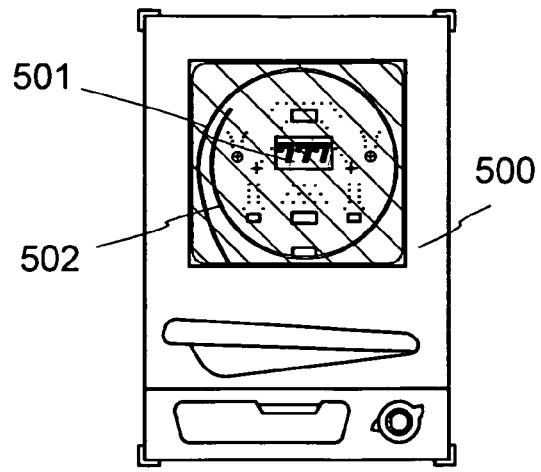
FIGS. 5A to 5E are views for explaining a game machine of the present invention.

FIG. 5A is a main body of a game machine, and a game machine 500 having a game board, an operating handle, and the like, has a display screen 501 and a display screen 502. The game machine 500 has a structure which is similar to that of a game machine shown in Embodiment Mode 1.

Figure 5B:
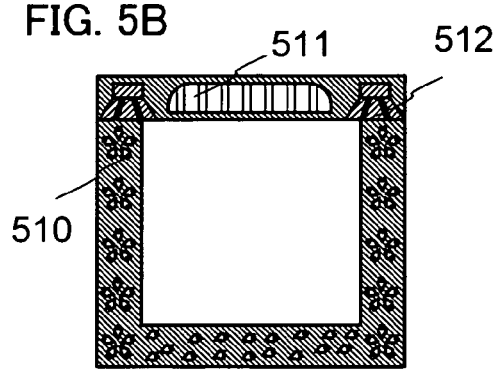
Figure 5C:
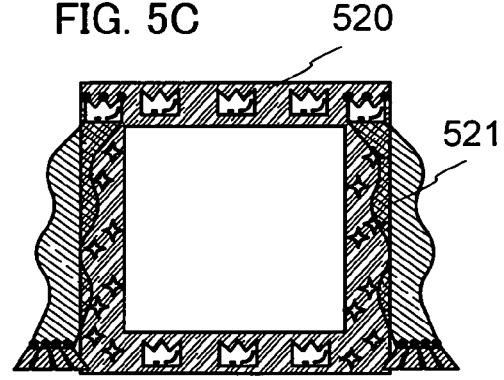
Figure 5D:
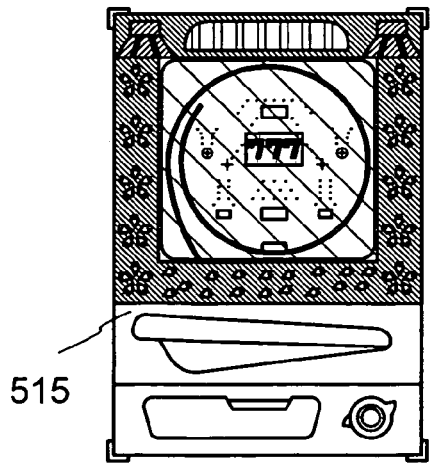

FIGS. 5B and 5C are decoration portions which can be attached to the game machine 500. The decoration portion also has a display screen which emits light. The display screen may be a light transmitting or non light transmitting display screen. In addition, an image on the display screen may be variable or invariable. In this embodiment mode, in the decoration portion of FIG. 5B, an image of a display screen 510 is not varied and a flower pattern is displayed by light emission. The light can be emitted in various patterns with flashes on and off and various emission intensity. The display screen 512 is a display screen formed over a flexible film. The film emits light while fluttering in wind from a fan or the like which is provided in a game parlor, which gives visual pleasure to the player. A fan has another function of cooling the heat generated by the display device due to light emission. An image of the display screen 511 is changed, which can give further information and visual excitement to a player. By attaching such a decoration portion to the game machine 500, an attractive game machine 515 which encourage the player to play can be provided (FIG. 5D).

Figure 5E:
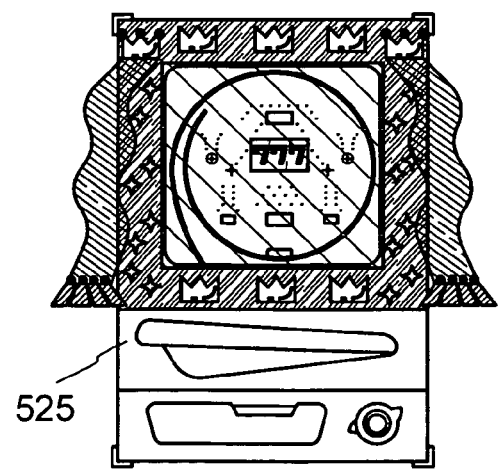

In FIG. 5C, a decoration portion has a light emitting display screen. A display screen 520 is the screen display which has a pattern like a crown or a star, which flashes on and off, changes its emission intensity, and can emit various light. In addition, the display screen 521 is a light transmitting display screen formed over a flexible film as the display screen 512. Therefore, when the display screen 521 flutters in wind in front of the game board, it does not disturb the view of the player and the player can enjoy the game with the image displayed on the display screen 521. By attaching such a decoration portion to the game machine 500, an attractive game machine 525 which enhances the player to play can be provided (FIG. 5E). The decoration portion of FIG. 5 is an example, and the present invention is not restricted thereto. The decoration portion may be appropriately set with various designs according to the age or sex of the player, game content, season, or the like.

A decoration portion may be formed as in the case of the display device shown in Embodiment Mode 2. A decoration portion which can be formed at low cost is preferable considering that it is changed frequently. When a printing method, a spray method, a spin coating method, a droplet discharge method, or the like is employed, a conductive layer, an insulating layer, a light emitting layer, and the like can be formed selectively, so that a step can be simplified and cost reduction can be realized.

In this embodiment mode, a structure in which a decoration portion is not mounted to front of the display screen 502 is shown. However, a light transmitting display screen can be formed in front of the display screen. In addition, a cover including a material in a liquid or gel state which changes a wave length and emission intensity of light to transmit may be provided so that a more complicated image can be displayed.

A game machine of the present invention enables a player to enjoy one's own game with various stimulating images and various operating procedures with the use of input means shown on the display screen; therefore it is possible to enhance the player to play the game machine.

Embodiment Mode 5

In this embodiment mode, a display device shown in Embodiment Modes 1 to 4 in which a grayscale is enhanced according to an image to be display is explained.

Figure 6A:
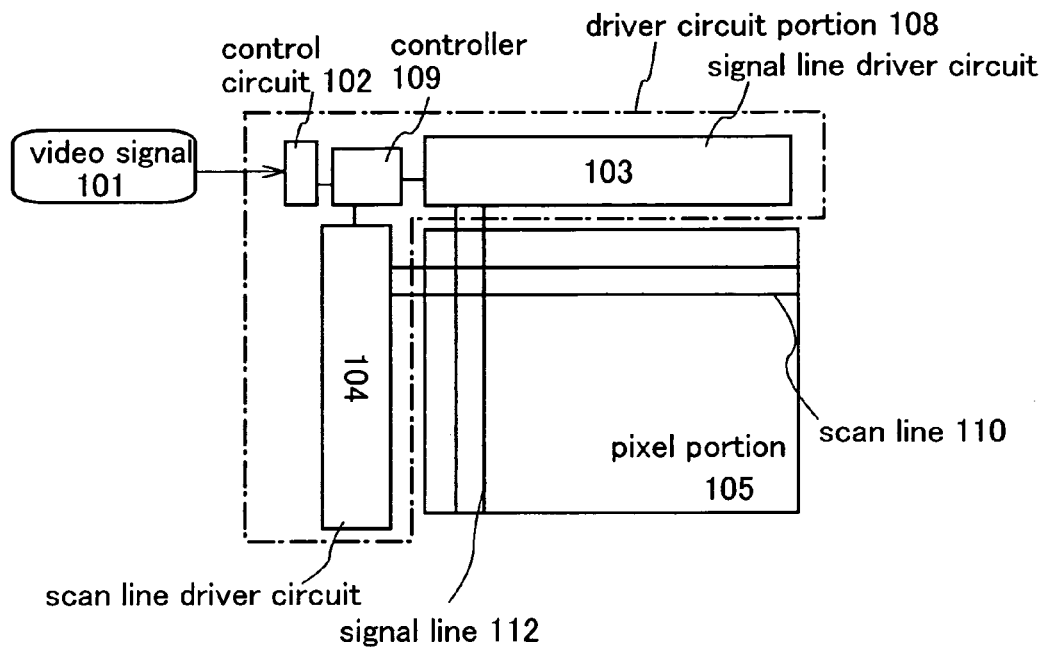
FIGS. 6A to 6C are views for explaining a system which can be applied to a display device of a game machine of the present invention.

FIG. 6A shows a system block diagram of a pixel portion 10 and a driver circuit portion 108 in a display device. In the pixel portion 105, a signal line 112 and a scan line 110 are crossed each other. The pixel portion 105 has a plurality of pixels and a switching element is provided at each intersection point of a signal line and scan line which serves as a pixel. An electric potential of a light emitting element can be controlled by the switching element. It is to be noted that the pixel portion of the present invention is not restricted to such an active type, and a passive type may be used. In a pixel portion of the passive type, since a switching element is not provided to each intersection point, a manufacturing step is simple and aperture ratio can be heightened.

The driver circuit portion 108 has a control circuit 102, a signal line driver circuit 103, and a scan line driver circuit 104. The control circuit 102 has a function of controlling a grayscale according to information to be displayed on the pixel portion 105. For example, the control circuit 102 enhances a grayscale of an arbitrary part of the pixel portion 105 according to the information to be displayed of the pixel portion 105. Specifically, a signal for heightening an electric potential to be applied to the signal line 112 is generated in the control circuit 102 and the signal is inputted to the controller 109. Accordingly, a light emitting element formed in the intersection point of the signal line 112 and the scan line 110 emits light with higher luminance, so that a high grayscale display can be conducted.

In addition, the controller 109 has a function for inputting a signal from the control circuit 102 to the signal line driver circuit 103, and the scan line driver circuit 104. It is to be noted that as mentioned above, in the case where the light emitting element emits light with higher luminance, a grayscale of a gray display region which is a region other than a high grayscale display region, can be lowered and a contrast can be enhanced. For example, an electric potential of a power supply line connected to the light emitting element is heightened in order to reduce a current to be applied to the light emitting element.

Accordingly, a high grayscale display according to information to be displayed can be conducted in an arbitrary portion of the pixel portion 105.

Figure 6B:
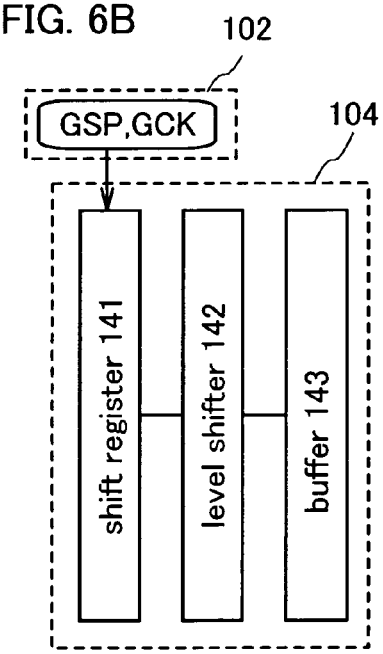
Figure 6C:
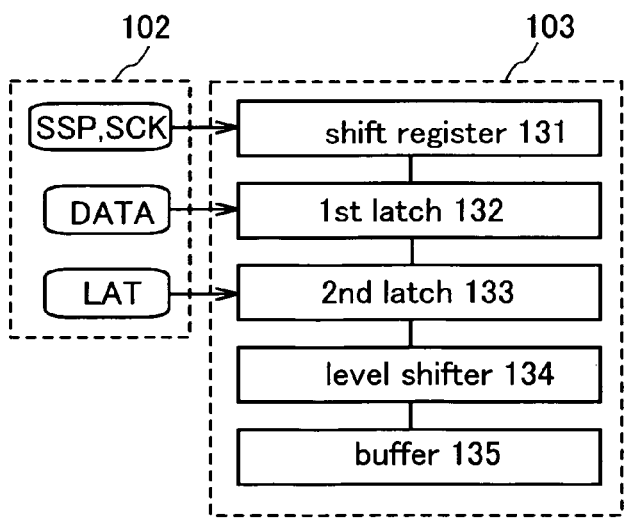

As shown in FIG. 6C, the signal line driver circuit 103 has circuits functioning as a shift register 131, a first latch 132, a second latch 133, a level shifter 134, and a buffer 135. Signals such as a start pulse (SSP), data (DATA) such as a video signal, and a latch (LAT) signal and the like are inputted to the level shifter 134, the first latch 132, and the second latch 133, respectively. It is to be noted that the signal line driver circuit according to the present invention is not limited thereto.

As shown in FIG. 6B, the scan line driver circuit 104 has circuits functioning as a shift register 141, a level shifter 142, and a buffer 143. Signals such as a gate start pulse (GSP), a gate clock signal (GCK), and the like are inputted to the shift register 141. It is to be noted that a scan line driver circuit of the present invention is not limited thereto.

The signal line driver circuit 103, the scan line driver circuit 104, and the pixel portion 105 can be formed of a semiconductor element provided over one substrate. For example, a thin film transistor provided over a glass substrate can be used. Further, the signal line driver circuit 103 or the scan line driver circuit 104 can be mounted over a substrate by using an IC chip.

Thus, a display device which can realize a high grayscale display according to the information to be displayed by the control circuit 102 can be provided according to the present invention.

Embodiment Mode 6

In this embodiment mode, an equivalent circuit of a pixel in the display device shown in Embodiment Modes 1 to 5 is described with reference to FIGS. 8A to 8D.

Figure 8A:
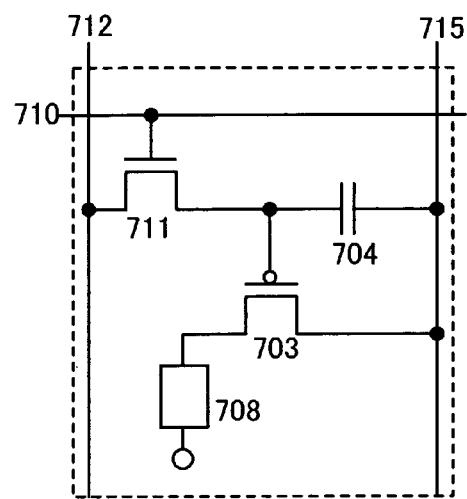
FIGS. 8A to 8D are views for explaining a pixel circuit which can be applied to a display device of a game machine of the present invention.

FIG. 8A shows an example of an equivalent circuit of a pixel, which includes a signal line 712, a power supply line 715, and a scan line 710, and at an intersecting portion thereof, a light emitting element 708, transistors 703 and 711, and a capacitor 704.

In this equivalent circuit, a video signal is inputted to the signal line 112 from a signal line driver circuit. The transistor 711 can control supply of the electric potential of the video signal to a gate of the transistor 703 in accordance with a selection signal that is inputted to the scan line 710, and is referred to as a switching transistor. The transistor 703 can control supply of current to the light emitting element 708 in accordance with the electric potential of the video signal, and is referred to as a driving transistor. The light emitting element goes into an emitting state in accordance with the supplied current, which makes it possible to display an image. The capacitor 704 can hold a voltage between the gate and source of the transistor 703. It is to be noted that, although the capacitor 704 is shown in FIG. 8A, the capacitor 704 is not necessarily provided when the gate capacitance of the transistor 703 or another parasitic capacitance is provided enough.

Figure 8B:
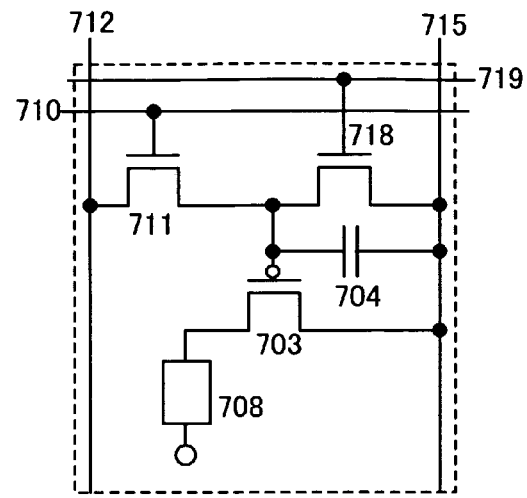

FIG. 8B is an equivalent circuit of a pixel where a scan line 719 and a transistor 718 are additionally provided to the circuit of the pixel shown in FIG. 8A.

The transistor 718 can make the electric potentials of the gate and the source of the transistor 703 equal to each other so that a state in which no current flows into the light emitting element 603 is forcibly made, and is referred to as an erasing transistor. Therefore, in time grayscale display, the next image signal can be inputted before inputting image signals into all pixels, and the duty ratio can be heightened.

Figure 8C:
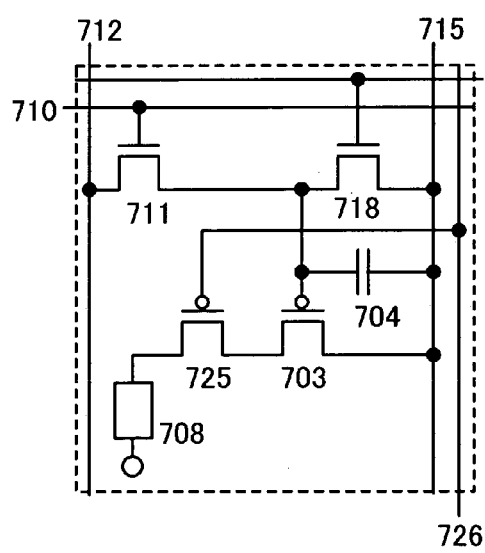

FIG. 8C shows an equivalent circuit of a pixel where a transistor 725 and a wire 726 are additionally provided to the circuit of a pixel shown in FIG. 8B. The gate of the transistor 725 has an electric potential fixed by the wire 726. In addition, the transistors 703 and 725 are connected in series between the power supply line 715 and the light emitting element 708. Therefore, in FIG. 8C, the transistor 725 can control the value of current supplied to the light emitting element 708 whereas the transistor 703 can control whether or not the current is supplied to the light emitting element 708.

The equivalent circuits of the pixels shown in FIGS. 8A to 8C can be driven by a digital method. In the case of driving the equivalent circuits by a digital method, some variations in electrical characteristics of each driving transistor are negligible, since the transistors are used as switching elements.

Figure 8D:
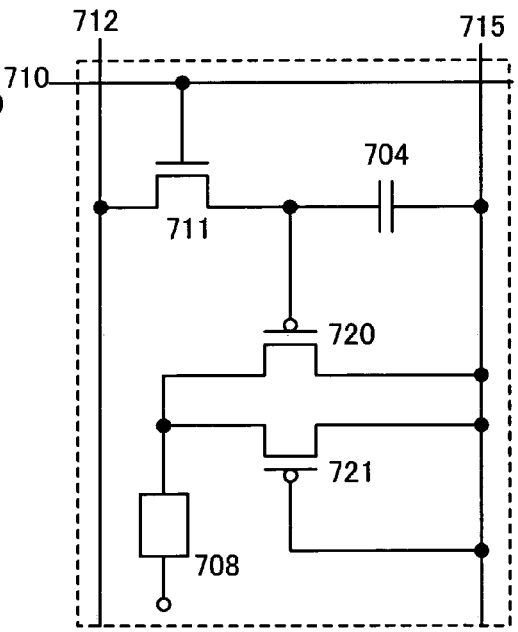

An equivalent circuit of a pixel of a display device of the present invention can be driven by either a digital method or an analog method. For example, an equivalent circuit of a pixel shown in FIG. 8D includes a signal line 712, a power supply line 715, and a scan line 710, and at an intersecting point thereof, a light emitting element 708, transistors 711, 720, and 721, and a capacitor 704. In FIG. 8D, the transistors 720 and 721, which are p-channel transistors, form a current mirror circuit. In such an equivalent circuit of a pixel, in the case of a digital method, a digital video signal is inputted from the signal line 712, and the value of a current supplied to the light emitting element 708 is controlled in accordance with a time grayscale. In the case of an analog method, an analog video signal is inputted from the signal line 712, and the value of the current supplied to the light emitting element 708 is controlled in accordance with the value of the analog video signal. In the case of driving the equivalent circuit by the analog method, lower power consumption can be achieved.

In each pixel described above, signals are inputted to the signal line 712, the power supply line 715, and the wire 726 from a signal line driver circuit. In addition, signals are inputted to the scan lines 710 and 719 from a scan line driver circuit. One or more signal line driver circuits and scan line driver circuits can be provided. For example, first and second scan line driver circuits can be provided with a pixel portion 705 interposed therebetween.

In addition, in the pixel shown in FIG. 8A, a state in which no current flows into the light emitting element 708 can be forcibly made as described with reference to FIG. 8B. For example, the transistor 711 is selected by a first scan line driver circuit at the moment when the light emitting element 708 lights up and a signal for forcibly applying no current into the light emitting element 708 is supplied to the scan line 710 by a second scan line driver circuit. The signal for forcibly applying no current (Write Erase Signal) is a signal for applying an electric potential so that first and second electrodes of the light emitting element 708 have the same electric potential. In this way, a state in which no current flows into the light emitting element 708 can be forcibly made, and the duty ratio can be heightened.

Figure 12:
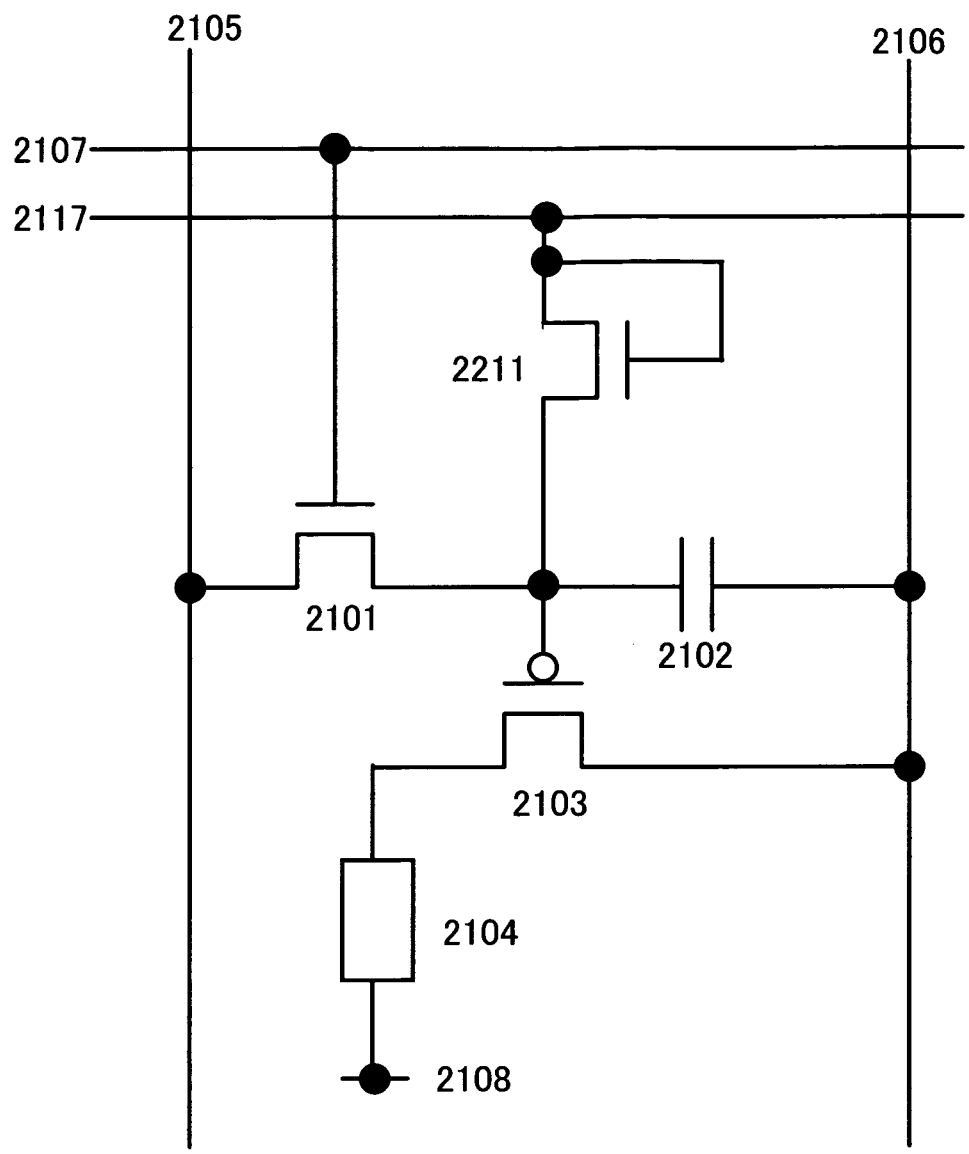
FIG. 12 is a view for explaining a pixel circuit which can be applied to a game machine of the present invention.

FIG. 12 is an example of a pixel structure in which an erasing diode 2211 is used in stead of the transistor 718 which is an erasing transistor. In FIG. 12, a selecting transistor 2101, a driving transistor 2103, the erasing transistor 2211, and a light emitting element 2104 are provided. A source and a drain of the selecting transistor 2101 are connected to a signal line 2105 and a gate of the driving transistor 2103, respectively. A gate of the selecting transistor 2101 is connected to a first gate line 2107. A source and a drain of the driving transistor 2103 are connected to a power supply line 2106 and the light emitting element 2104, respectively. The erasing diode 2211 is connected to the gate of the driving transistor 2103 and a second gate line 2117.

A holding capacitor 2102 has a function of holding a gate electric potential of the driving transistor 2103. Therefore, the holding capacitor 2102 is connected between the gate of the driving transistor 2103 and the power supply line 2106. However, the position of the holding capacitor 2102 is not restricted thereto. The holding capacitor 2102 may be placed so as to be able to hold the gate electric potential of the driving transistor 2103. When the gate electric potential of the driving transistor 2103 can be held by using a gate capacitor of the driving transistor 2103 or the like, the holding capacitor 2102 is not necessarily provided.

A driving method is as follows. The first gate line 2107 is selected to turn the selecting transistor 2101 on, and then a signal is inputted to the holding capacitor 2102 from the signal line 2105. Then, a current of the driving transistor 2103 is controlled in accordance with the signal, so that the current flows to a second power supply line 2108 from a first power supply line 2106 through the light emitting element 2104.

In order to erase the signal, the second gate line 2117 is selected (in this case, an electric potential of the second gate line is heightened) and the erasing diode 2111 is turned on to feed a current to a gate of the driving transistor 2103 from the second gate line 2117. Consequently, the driving transistor 2103 comes to an off-state. Then, a current does not flow to the second power supply line 2108 from the first power source line 2106 through the light emitting element 2104. As a result, a non-light emitting period can be realized and a lighting period can be freely controlled In order to hold a signal, the second gate line 2117 is not selected (in this case, an electric potential of the second date line is lowered). Thus, a gate electric potential of the second transistor 2103 is held since the erasing diode 2111 is turned off.

Further, the erasing diode 2111 is not particularly restricted as long as it is an element having a rectifying property. A pn-type diode or a pin-type diode, a Schottky diode or a zener diode may be used.

Further, a transistor having a diode connection (connection of gate and a drain) may be used as a diode. In this embodiment mode, a transistor having a diode connection is used as the erasing diode 2211. Although an n-channel transistor is used, this embodiment mode is not restricted thereto and a p-channel transistor may be used.

As thus described, an equivalent circuit of a pixel in a display device can take many forms. This embodiment mode can be applied to any display devices of a game machine in Embodiment Modes 1 to 5.

Embodiment Mode 7

In this embodiment mode, a system and structure for controlling a value of voltage or current applied to a light emitting element in a gray display region are explained. It is to be noted that a voltage and a current applied to a light emitting element 750 depend on an electric potential difference between a first electrode 751 and a second electrode 752. In this embodiment mode, since the second electrode 752 is shared by light emitting elements, a case in which an electric potential of the first electrode 751 is controlled is explained. However, the present invention is not restricted thereto and the electric potential of the second electrode 752 may be controlled.

Figure 7A:
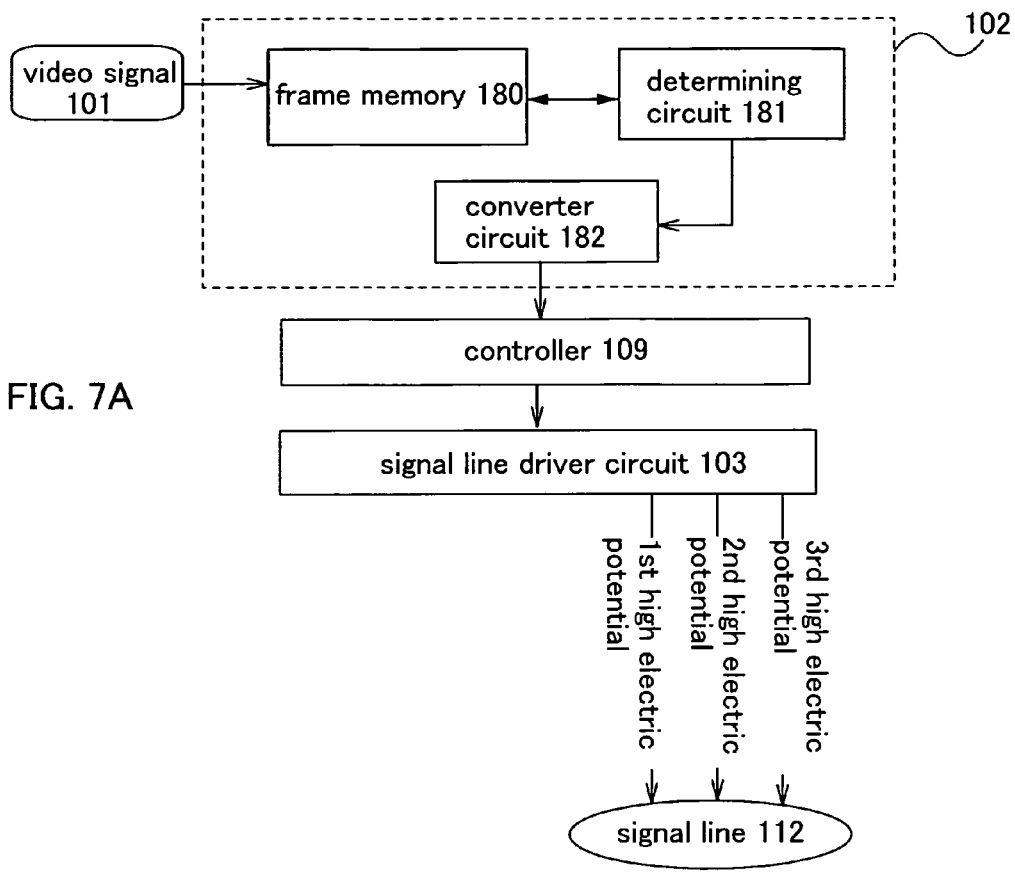
FIGS. 7A to 7C are views for explaining a system which can be applied to a display device of a game machine of the present invention.

As shown in FIG. 7A, a control circuit 102 has a frame memory 180 in which a video signal 101 is stored. The frame memory can store a video signal for one frame, fore example. Whether a high level grayscale display is to be conducted or not is determined by a determining circuit 181 according to the stored video signal, that is, video information. When a high level grayscale display is conducted, the video signal 101 is not gently distributed over an intermediate grayscale region, but the video signal 101 is distributed separately in a high grayscale region and a low grayscale region. According to the distribution, whether high level grayscale display is to be conducted or not can be determined. In addition, whether a high grayscale display is to be conducted or not can be determined according to the difference between the number of grayscale levels of the high grayscale region and that of the low grayscale region where many video signals 101 are distributed. A standard of the luminance distribution to determine to conduct the high level grayscale display may be decided by a user or a designer.

When the determining circuit 181 determines to conduct a high grayscale display, the number of grayscale levels is converted by a converter circuit 182 and the image signal is inputted to the signal line driver circuit 103 through a controller 109. A display device can conduct a high grayscale display in an arbitrary portion of a pixel portion 105 by controlling an amount of a current to be applied to each light emitting element 750. Therefore, the number of grayscale levels is converted so that the number of the grayscale in a region conducting a high grayscale display is increased, and the grayscale number of a region conducting a gray display is decreased. The signal which is converted according to the increased number of the grayscale, is inputted from a signal line driver circuit 103 to a signal line 112 and is controlled to heighten an electric potential of the first electrode 751 of a light emitting element. An electric potential to be heightened may be set at a plurality of electric potentials such as first to third electric potential. Of course the electric potential to be risen may be set at one electric potential. When the signal which is converted in accordance with the decreased number of the grayscale level is inputted from the signal line driver circuit 103 to the signal line 112, an electric potential of the first electrode 751 of a light emitting element is controlled to be lowered. Accordingly, luminance of the light emitting element 750 in an arbitrary pixel can be heightened according to information to be displayed.

In another example where the electric potential of the second electrode 752 is controlled, the electric potential of the second electrode 752 of all light emitting elements are controlled in the same manner since the second electrode 752 is shared by light emitting elements 750. Specifically, the electric potential of the second electrode 752 of all light emitting elements is controlled to be lowered in order to conduct a high grayscale display. Therefore, in a gray display region which is a region except a high grayscale display region, the electric potential of the first electrode 751 of light emitting element is selectively controlled to be lowered. Accordingly, luminance of the gray display region where a high grayscale display is not conducted can be prevented from being heightened.

Of course, the second electrode 752 is not necessarily shared by the light emitting elements 750 and may be processed into a desired shape. In that case, the electric potential of the second electrode 752 is respectively controlled, so that the electric potential of the signal line 112 is not necessarily controlled.

Figure 7B:
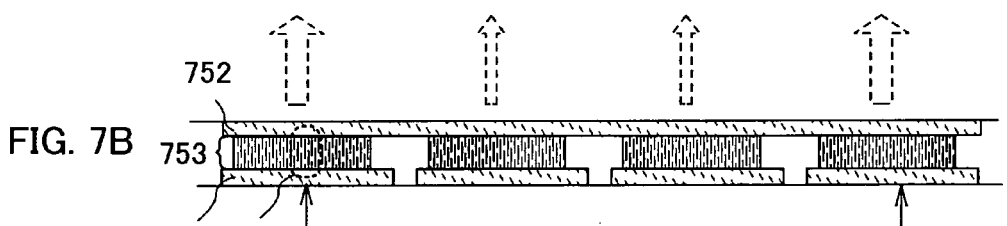

FIG. 7B shows a model diagram of the first electrode 751 and the second electrode 752, with a layer containing a light emitting material 753 interposed therebetween. When a high grayscale display is conducted as described above, and when a high grayscale display is conducted in only a predetermined region, (in FIG. 7B, only the regions at the ends), the electric potential of the first electrode 751 is controlled by a signal from the signal line 112 so that the layer containing a light emitting material 753 formed in a region conducting a high grayscale display has a high electric potential.

Figure 7C:
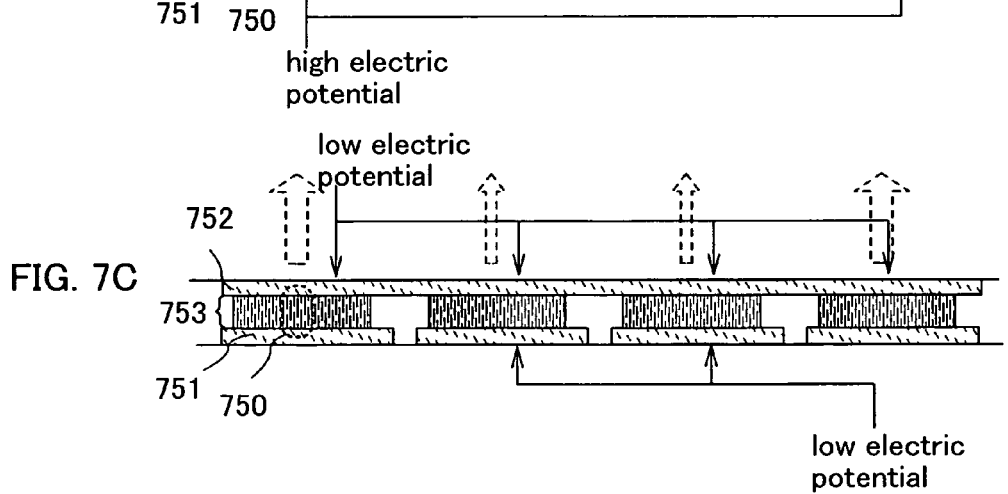

Alternatively, as shown in FIG. 7C, in the case where a high grayscale display is conducted by controlling the electric potential of the shared second electrode 752, the electric potential of the second electrode 752 in all light emitting elements are lowered. Therefore, the electric potential of the first electrode 751 is lowered selectively in order to keep the luminance in other regions.

As a result, a high grayscale display can be conducted in only a predetermined region and the display in which luminance is prevented from becoming heightened can be conducted in other regions.

Such a controlling method can be applied to an analog display system. It is to be noted that in the case of a digital display system, a light emission time may be controlled to be short in the region where gray display described above is conducted. For example, the light emitting element 750 may be forcibly turned off with an erasing transistor.

As described above, a voltage or a current to be applied to a light emitting element can be controlled so as to conduct a high grayscale display with raised luminance. In addition, in a gray display, the grayscale can be lowered. An effect that grayscale is heightened according to information to be displayed can be obtained by applying this embodiment mode to a display device of each game machine shown in Embodiment Modes 1 to 4.

It is to be noted that although an active type display device is used in this embodiment mode, luminance of a high grayscale display region can be also heightened according to information to be displayed in a passive type display device.

This application is based on Japanese Patent Application serial no. 2005-080763 filed in Japan Patent Office on Mar. 18, 2005, the entire contents of which are hereby incorporated by reference.

What is claimed is:

1. A game machine comprising:
a game board;
a first display screen over the game board;
a second display screen over the first display screen, and comprising:
  a light transmitting substrate having a first surface and a second surface, wherein the second surface is opposed to the first surface; and
  a light emitting element over the first surface of the light transmitting substrate, and comprising:
    a pair of light transmitting electrodes; and
    a light emitting material between the pair of light transmitting electrodes,
wherein the first display screen is entirely covered by the light emitting element,
wherein light emitted from the first display screen passes through the light emitting element, and
wherein a metal ball having a light reflective surface passes between the second display screen and the game board so that light emitted from the light emitting element is scattered.

2. A game machine comprising:
a game board;
a first display screen over the game board;
a second display screen over the first display screen, and comprising:
  a light transmitting substrate; and
  a light emitting element over a first surface of the light transmitting substrate, and comprising:
    a pair of light transmitting electrodes; and
    a light emitting material between the pair of light transmitting electrodes,
  an input means mounted over a second surface of the light transmitting substrate, wherein the second surface is opposed to the first surface,
wherein the first display screen is entirely covered by the light emitting element, wherein light emitted from the first display screen passes through the light emitting element,
wherein a metal ball having a light reflective surface passes between the second display screen and the game board so that light emitted from the light emitting element is scattered, and
wherein the first display screen and the second display screen stop displaying image when there is no player according to information inputted by the input means.

3. A game machine comprising:
a game board;
a first display screen over the game board;
a second display screen over the first display screen, and comprising:
   a light transmitting substrate; and
   a light emitting element over the light transmitting substrate, and comprising:
      a pair of light transmitting electrodes; and
      a light emitting material between the pair of light transmitting electrodes,
a third display screen comprising an input means,
wherein the first display screen is entirely covered by the light emitting element,
wherein light emitted from the first display screen passes through the light emitting element, and
wherein a metal ball having a light reflective surface passes between the second display screen and the game board so that light emitted from the light emitting element is scattered,
wherein a game state is changed according to information inputted by the input means, and
wherein an image of the first display screen and an image of the second display screen are changed when the game state is changed.

4. A game machine comprising:
a game board;
a first display screen over the game board;
a second display screen over the first display screen, and comprising:
   a light transmitting substrate; and
   a light emitting element over the light transmitting substrate, and comprising:
      a pair of light transmitting electrodes; and
      a light emitting material between the pair of light transmitting electrodes,
a third display screen comprising an input means,
wherein the first display screen is entirely covered by the light emitting element,
wherein light emitted from the first display screen passes through the light emitting element, and
a detecting means for detecting a game state,
wherein a metal ball having a light reflective surface passes between the second display screen and the game board so that light emitted from the light emitting element is scattered, and
when the game state is changed according to information inputted by the input means and the game state is detected by the detecting means, an image of the first display screen and an image of the second display screen are changed to display information according to the game state which is detected.

5. The game machine according to claim 1,
wherein the second display screen displays an image according to a video signal and has a driver circuit portion to which the video signal is inputted, and
the driver circuit portion has a circuit for controlling a grayscale according to information to be displayed on the second display screen.

6. The game machine according to claim 2,
wherein the second display screen displays an image according to a video signal and has a driver circuit portion to which the video signal is inputted, and
the driver circuit portion has a circuit for controlling a grayscale according to information to be displayed on the second display screen.

7. The game machine according to claim 3,
wherein the second display screen displays an image according to a video signal and has a driver circuit portion to which the video signal is inputted, and
the driver circuit portion has a circuit for controlling a grayscale according to information to be displayed on the second display screen.

8. The game machine according to claim 4,
wherein the second display screen displays an image according to a video signal and has a driver circuit portion to which the video signal is inputted, and
the driver circuit portion has a circuit for controlling a grayscale according to information to be displayed on the second display screen.

9. The game machine according to claim 1,
wherein the second display screen displays an image according to a video signal and has a driver circuit portion to which the video signal is inputted, and
the driver circuit portion has a control circuit for controlling a grayscale according to information to be displayed on the second display screen.

10. The game machine according to claim 2,
wherein the second display screen displays an image according to a video signal and has a driver circuit portion to which the video signal is inputted, and
the driver circuit portion has a control circuit for controlling a grayscale according to information to be displayed on the second display screen.

11. The game machine according to claim 3,
wherein the second display screen displays an image according to a video signal and has a driver circuit portion to which the video signal is inputted, and
the driver circuit portion has a control circuit for controlling a grayscale according to information to be displayed on the second display screen.

12. The game machine according to claim 4,
wherein the second display screen displays an image according to a video signal and has a driver circuit portion to which the video signal is inputted, and
the driver circuit portion has a control circuit for controlling a grayscale according to information to be displayed on the second display screen.

13. The game machine according to claim 1,
wherein the second display screen displays an image according to a video signal and has a driver circuit portion to which the video signal is inputted, and
the driver circuit portion controls emission intensity of the light emitting element according to information to be displayed on a first region in the second display screen, and has a control circuit for controlling emission intensity of the light emitting element in a second region in the second display screen.

14. The game machine according to claim 2,
wherein the second display screen displays an image according to a video signal and has a driver circuit portion to which the video signal is inputted, and the driver circuit portion controls emission intensity of the light emitting element according to information to be displayed on a first region in the second display screen, and has a control circuit for controlling emission intensity of the light emitting element in a second region in the second display screen.

15. The game machine according to claim 3,
wherein the second display screen displays an image according to a video signal and has a driver circuit portion to which the video signal is inputted, and
the driver circuit portion controls emission intensity of the light emitting element according to information to be displayed on a first region in the second display screen, and has a control circuit for controlling emission intensity of the light emitting element in a second region in the second display screen.

16. The game machine according to claim 4,
wherein the second display screen displays an image according to a video signal and has a driver circuit portion to which the video signal is inputted, and
the driver circuit portion controls emission intensity of the light emitting element according to information to be displayed on a first region in the second display screen, and has a control circuit for controlling emission intensity of the light emitting element in a second region in the second display screen.

17. The game machine according to claim 1,
wherein the second display screen displays an image according to a video signal and has a driver circuit portion to which the video signal is inputted, and
the driver circuit portion has a control circuit for controlling a plurality of emission intensity of the light emitting element according to information to be displayed on the second display screen.

18. The game machine according to claim 2,
wherein the second display screen displays an image according to a video signal and has a driver circuit portion to which the video signal is inputted, and
the driver circuit portion has a control circuit for controlling a plurality of emission intensity of the light emitting element according to information to be displayed on the second display screen.

19. The game machine according to claim 3,
wherein the second display screen displays an image according to a video signal and has a driver circuit portion to which the video signal is inputted, and
the driver circuit portion has a control circuit for controlling a plurality of emission intensity of the light emitting element according to information to be displayed on the second display screen.

20. The game machine according to claim 4,
wherein the second display screen displays an image according to a video signal and has a driver circuit portion to which the video signal is inputted, and
the driver circuit portion has a control circuit for controlling a plurality of emission intensity of the light emitting element according to information to be displayed on the second display screen.

21. The game machine according to claim 1, further comprising an input means over the second surface of the light transmitting substrate, wherein the input means is a sensor.

22. The game machine according to claim 2, wherein the input means is a sensor.

23. The game machine according to claim 3, wherein the input means is a sensor.

24. The game machine according to claim 4, wherein the input means is a sensor.

25. The game machine according to claim 1, further comprising an input means is mounted on the second display screen, wherein the input means is a touch panel.

26. The game machine according to claim 2, wherein the input means is a touch panel.

27. The game machine according to claim 3, wherein the input means is a touch panel.

28. The game machine according to claim 4, wherein the input means is a touch panel.

* * * * *

UNITED STATES PATENT AND TRADEMARK OFFICE
CERTIFICATE OF CORRECTION

| | |
|---|---|
| PATENT NO. | : 8,550,907 B2 |
| APPLICATION NO. | : 11/374429 |
| DATED | : October 8, 2013 |
| INVENTOR(S) | : Yamazaki et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1954 days.

Signed and Sealed this
Third Day of May, 2016

Michelle K. Lee
*Director of the United States Patent and Trademark Office*